US008443074B2

(12) United States Patent
Bahl et al.

(10) Patent No.: US 8,443,074 B2
(45) Date of Patent: May 14, 2013

(54) CONSTRUCTING AN INFERENCE GRAPH FOR A NETWORK

(75) Inventors: Paramvir Bahl, Issaquah, WA (US); Srikanth Kandula, Somervile, MA (US); Ranveer Chandra, Kirkland, WA (US); David A. Maltz, Bellevue, WA (US); Ming Zhang, Redmond, WA (US); Albert Greenberg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1001 days.

(21) Appl. No.: 12/039,714

(22) Filed: Feb. 28, 2008

(65) Prior Publication Data

US 2008/0222287 A1 Sep. 11, 2008

Related U.S. Application Data

(60) Provisional application No. 60/893,348, filed on Mar. 6, 2007.

(51) Int. Cl.
*G06F 15/16* (2006.01)
*G06F 17/00* (2006.01)

(52) U.S. Cl.
USPC ............................................ 709/224; 706/46

(58) Field of Classification Search .......... 714/733–736, 714/4; 703/2, 22; 706/21, 52, 46; 709/217–219, 709/223–226; 715/734, 736, 771, 853
See application file for complete search history.

(56) References Cited

U.S. PATENT DOCUMENTS

| 4,933,933 A | 6/1990 | Dally et al. |
| 5,309,448 A | 5/1994 | Bouloutas et al. |
| 5,850,388 A | 12/1998 | Anderson et al. |
| 6,115,393 A | 9/2000 | Engel et al. |
| 6,336,138 B1 | 1/2002 | Caswell et al. |

(Continued)

FOREIGN PATENT DOCUMENTS

| EP | 1191803 A1 | 3/2002 |
| WO | WO03067431 A1 | 8/2003 |
| WO | WO2005060162 A2 | 6/2005 |

OTHER PUBLICATIONS

H. Boudali, J. B. Dugan ("A discrete-time Bayesian network reliability modeling and analysis framework" Science Direct, University of Virginia, School of Engineering and Applied Science,, Aug. 12, 2004, pp. 337-349).*

(Continued)

*Primary Examiner* — Chirag R Patel
(74) *Attorney, Agent, or Firm* — Lee & Hayes, PLLC

(57) ABSTRACT

Constructing an inference graph relates to the creation of a graph that reflects dependencies within a network. In an example embodiment, a method includes determining dependencies among components of a network and constructing an inference graph for the network responsive to the dependencies. The components of the network include services and hardware components, and the inference graph reflects crosslayer components including the services and the hardware components. In another example embodiment, a system includes a service dependency analyzer and an inference graph constructor. The service dependency analyzer is to determine dependencies among components of a network, the components including services and hardware components. The inference graph constructor is to construct an inference graph for the network responsive to the dependencies, the inference graph reflecting cross-layer components including the services and the hardware components.

20 Claims, 17 Drawing Sheets

U.S. PATENT DOCUMENTS

| | | | |
|---|---|---|---|
| 6,373,825 B1 | 4/2002 | Fuchs et al. | |
| 6,442,694 B1 | 8/2002 | Bergman et al. | |
| 6,456,306 B1 | 9/2002 | Chin et al. | |
| 6,574,788 B1 | 6/2003 | Levine et al. | |
| 6,628,304 B2 | 9/2003 | Mitchell et al. | |
| 6,691,249 B1 * | 2/2004 | Barford et al. | 714/25 |
| 6,704,812 B2 | 3/2004 | Bakke et al. | |
| 6,751,661 B1 | 6/2004 | Geddes | |
| 6,826,590 B1 | 11/2004 | Glanzer et al. | |
| 6,873,619 B1 | 3/2005 | Edwards | |
| 6,959,403 B2 | 10/2005 | Dierauer et al. | |
| 6,993,686 B1 | 1/2006 | Groenendaal et al. | |
| 7,131,037 B1 | 10/2006 | LeFaive et al. | |
| 7,142,820 B1 | 11/2006 | Rajala | |
| 7,151,744 B2 | 12/2006 | Sarkinen et al. | |
| 7,240,325 B2 * | 7/2007 | Keller | 717/104 |
| 7,269,625 B1 | 9/2007 | Willhide et al. | |
| 7,328,127 B2 | 2/2008 | Otsuka et al. | |
| 7,328,200 B2 * | 2/2008 | Przytula | 706/52 |
| 7,389,347 B2 * | 6/2008 | Brodie et al. | 709/224 |
| 7,409,676 B2 * | 8/2008 | Agarwal et al. | 717/120 |
| 7,483,379 B2 | 1/2009 | Kan et al. | |
| 7,627,671 B1 * | 12/2009 | Palma et al. | 709/224 |
| 7,809,663 B1 * | 10/2010 | Birch et al. | 706/45 |
| 2002/0032769 A1 | 3/2002 | Barkai et al. | |
| 2002/0165957 A1 | 11/2002 | Devoe et al. | |
| 2003/0084146 A1 | 5/2003 | Schilling et al. | |
| 2004/0172467 A1 | 9/2004 | Wechter et al. | |
| 2005/0071445 A1 | 3/2005 | Siorek et al. | |
| 2005/0071457 A1 | 3/2005 | Yang-Huffman et al. | |
| 2005/0226195 A1 | 10/2005 | Paris et al. | |
| 2005/0243729 A1 | 11/2005 | Jorgenson et al. | |
| 2006/0085858 A1 | 4/2006 | Noel et al. | |
| 2006/0153068 A1 | 7/2006 | Dally et al. | |
| 2007/0043861 A1 | 2/2007 | Baron et al. | |
| 2007/0162595 A1 | 7/2007 | Samprathi | |
| 2008/0016206 A1 | 1/2008 | Ma et al. | |

OTHER PUBLICATIONS

Steinder, Sethi ("Probabilistic Fault Localization in Communication Systems Using Belief Networks", IEEE/ACM Transactions on Networking, vol. 12, Oct. 5, 2004, pp. 809-822).*

Bahl, et al., "Discovering Dependencies for Network Management", available as early as Dec. 26, 2006, at <<http://research.microsoft.com/projects/constellation/papers/hotnets06.pdf>>, pp. 1-6.

Bahl, et al., "Towards Highly Reliable Enterprise Network Services Via Inference of Multi-level Dependencies", SIGCOMM'07, Aug. 27-31, 2007, pp. 1-12.

Friedman, et al., "Load Balancing Schemes for High Throughput Distributed Fault-Tolerant Servers", available as early as Dec. 26, 2006, at <<http://historical.ncstrl.org/tr/ps/cornellcs/TR96-1616.ps>>, Dec. 8, 1996, pp. 1-20.

Kandula, et al., "Shrink: A Tool for Failure Diagnosis in IP Networks", SIGCOMM'05 Workshops, Aug. 2005, pp. 1-6.

Kompella, et al., "IP Fault Localization Via Risk Modeling", University of California and AT&T Labs-Research, pp. 1-15.

Lau, et al., "Service Model and Its Application to Impact Analysis", Telcordia Transactions, 2004, pp. 1-12.

Reynolds, et al., "WAP5: Black-box Performance Debugging for Wide-Area Systems", International World Wide Web, May 23-26, 2006, pp. 1-10.

Rish, et al., "Efficient fault diagnosis using probing", AAAI, 2005, pp. 1-8.

Smarts, "InCharge Application Services Manager User's Guide", System Management ARTS Incorporated, Version 5.0.1, Dec. 2002, pp. 1-76.

Steinder, et al., "End-to-end Service Failure Diagnosis Using Belief Networks", available as early as Dec. 26, 2006, at <<http://www.cis.udel.edu/~sethi/papers/02/noms02.pdf>>, University of Delaware, pp. 1-16.

Yemini, et al., "High Speed and Robust Event Correlation", IEEE, May 1996, pp. 82-90.

Natu, et al., "Active Probing Approach for Fault Localization in Computer Networks" available as early as Dec. 26, 2006, at <<http://www.cis.udel.edu/~sethi/papers/06/e2emon06.pdf>>, pp. 9.

Steinder, et al., "A survey of fault localization techniques in computer networks", avaliable as early as Dec. 26, 2006, at <<http://www.cis.udel.edu/~sethi/papers/04/socp04.pdf>>, 2004, pp. 165-194.

Steinder, et al., "The present and future of event correlation: A need for end-to-end service fault localization", available as early as Dec. 26, 2006, at <<http://www.cis.udel.edu/~steinder/PAPERS/sci2001.pdf>>, pp. 6.

* cited by examiner

Example Inference Environment

Examples of False Positive Rejection

Examples of Statistical False Positive/Negative Identification

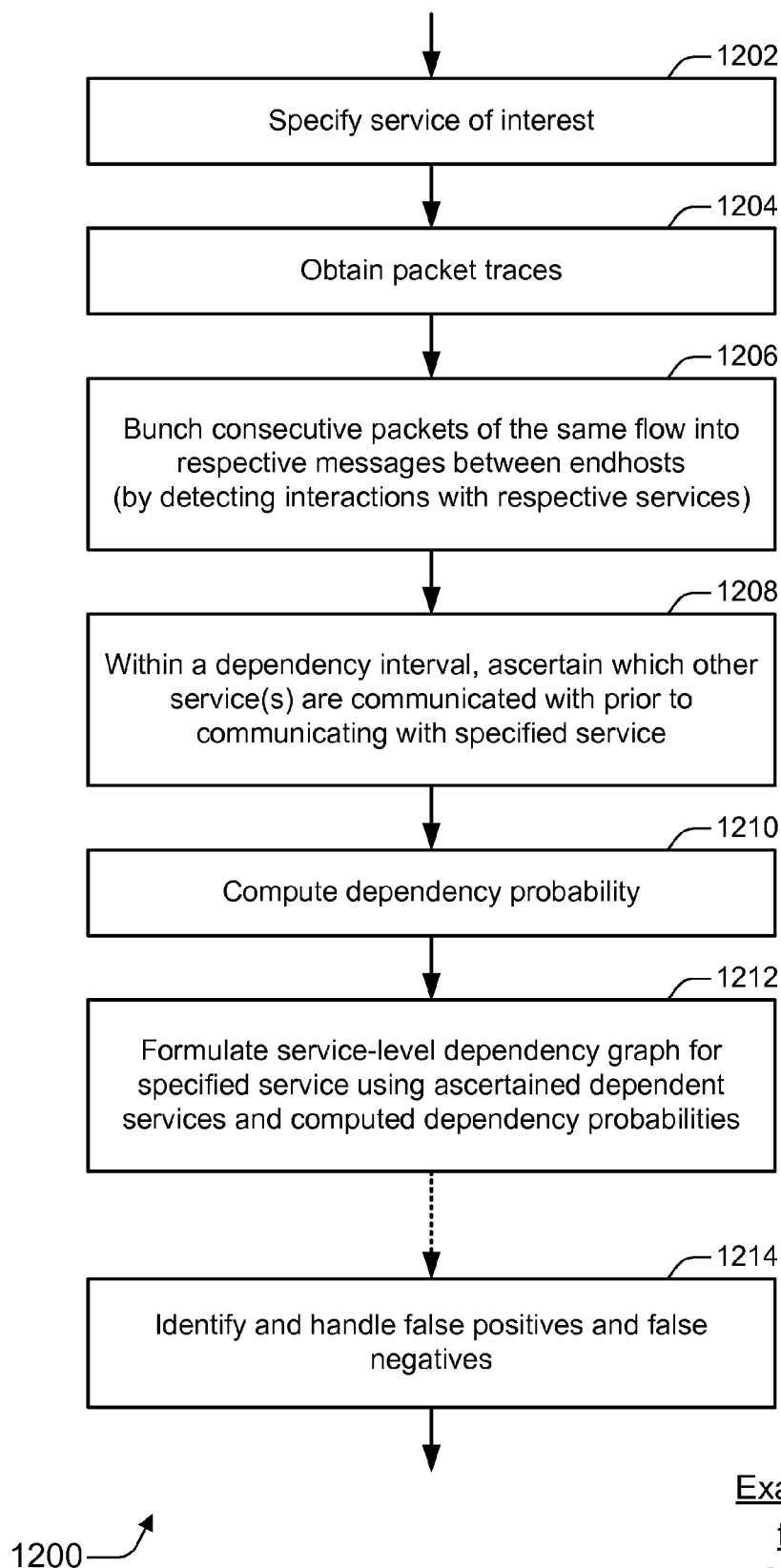
FIG. 12 Example Method for Building Service-Level Dependency Graphs

Example General Method for Constructing an Inference Graph

Example Specific Method for Constructing an Inference Graph

US 8,443,074 B2

CONSTRUCTING AN INFERENCE GRAPH FOR A NETWORK

CROSS-REFERENCE(S) TO RELATED APPLICATION(S)

This U.S. Nonprovisional Patent Application claims the benefit of U.S. Provisional Patent Application 60/893,348, filed on 6 Mar. 2007 and entitled "Constructing an Inference Graph". U.S. Provisional Patent Application 60/893,348 is hereby incorporated by reference in its entirety herein.

BACKGROUND

Using a network-based service can be a frustrating experience that is marked by the appearances of familiar hourglass or beachball icons. These icons indicate that a request is in progress and that a user must continue to wait for a response to the request. Unfortunately, the request may not be fulfilled for some time, if ever. The user is often not provided an accurate indication of when the request is expected to be fulfilled. Moreover, when there is a problem, the user is rarely provided a reliable indication of where the problem lies, and the user is even less likely to be told how the problem might be mitigated.

Even inside the network of a single enterprise, where traffic does not need to cross the open Internet, users are subjected to the negative effects of network problems. Information technology (IT) personnel of the enterprise are charged with locating and mitigating these network problems. Unfortunately, IT personnel are often also uncertain how to diagnose and remedy such network problems. Although IT personnel are given management tools that indicate when a particular hardware component (e.g., a server, link, switch, etc.) is overloaded, these tools can produce so many alerts that the IT personnel eventually start to ignore them. Such management tools also usually fail to address the integrated and changing nature of enterprise networks. In short, network problems tend to persist because current network and service monitoring tools do not scale to the size, complexity, or rate-of-change of today's enterprise networks.

SUMMARY

Constructing an inference graph relates to the creation of a graph that reflects dependencies within a network. In an example embodiment, a method includes determining dependencies among components of a network and constructing an inference graph for the network responsive to the dependencies. The components of the network include services and hardware components, and the inference graph reflects cross-layer components including the services and the hardware components. In another example embodiment, a system includes a service dependency analyzer and an inference graph constructor. The service dependency analyzer is to determine dependencies among components of a network, the components including services and hardware components. The inference graph constructor is to construct an inference graph for the network responsive to the dependencies, the inference graph reflecting cross-layer components including the services and the hardware components.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

FIG. 12 is a flow diagram that illustrates an example of a method for building service-level dependency graphs.

DETAILED DESCRIPTION

Introduction to Construction an Inference Graph

Figure 1:
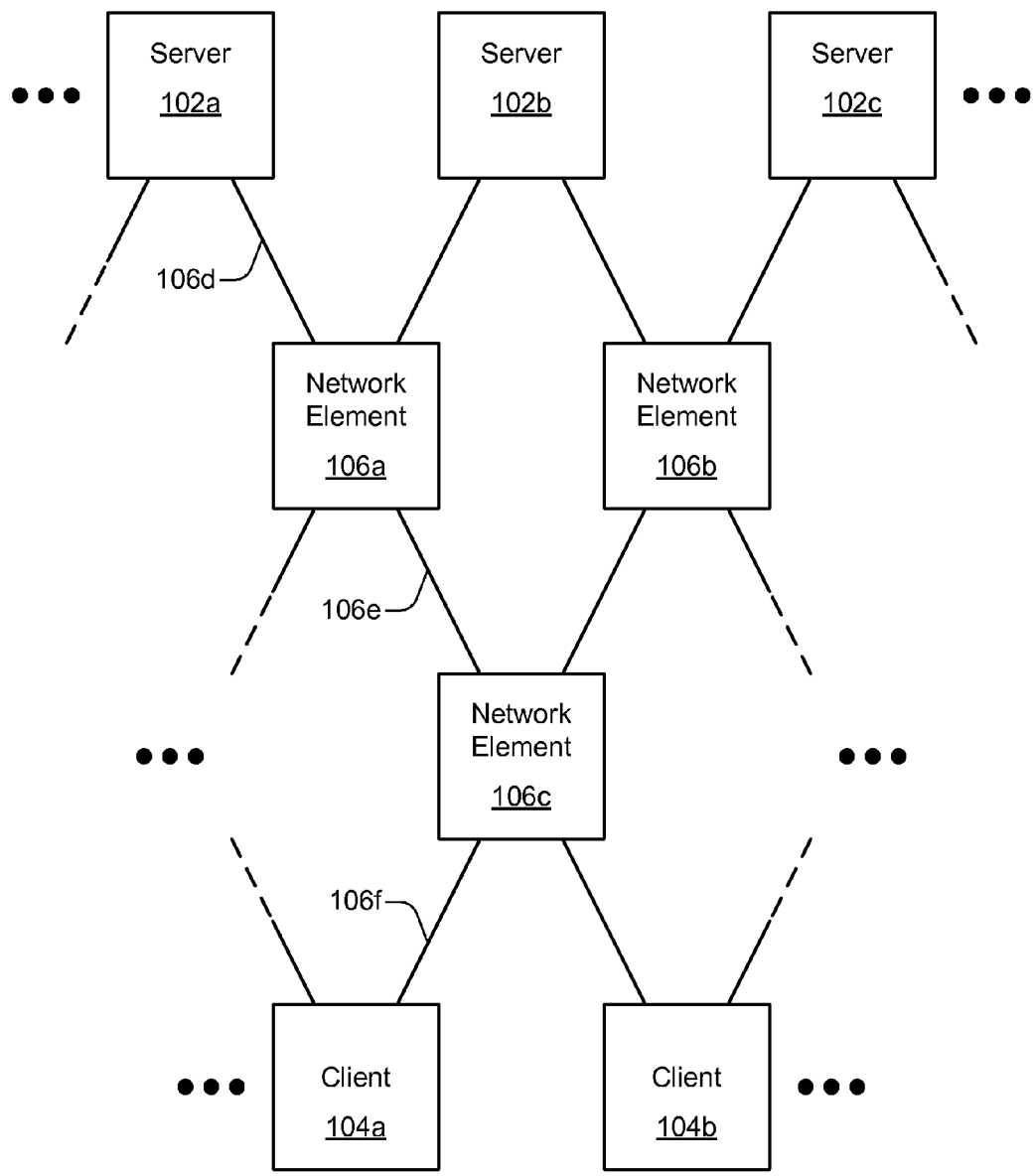
FIG. 1 is a block diagram of an example network that may be used in conjunction with embodiments for constructing an inference graph.

Localizing the sources of network problems in large, e.g., enterprise networks is extremely challenging. Dependencies are numerous, complex, and inherently multi-level, spanning a plethora of hardware and software components across both the core and the computing infrastructure of the network. An inference graph model is described herein that can be employed to discover and actually exploit these dependencies for fast and accurate network problem localization. Network problems can arise at any level and as a result of any general network component. For example, network problems can be within the core of a network (e.g., routers, links, switches, etc.), with the endhosts of a network (e.g., clients that are primarily used by humans, servers that primarily provide some service or application to clients and/or other servers, etc.), with services of the network (e.g., websites, web services, DNS, etc.), and so forth. Examples of general network components that can cause and/or be affected by network problems are described herein below with particular reference to FIG. 3.

Embodiments of this inference graph model are adaptable to address user-perceptible problems that are rooted in conditions giving rise to partial service degradation as well as hard faults. Furthermore, methods, systems, etc. are described that may be used to construct inference graphs for an operational enterprise network (or other networks) and that may be used to infer various attributes of the network. The inference graph results may also be leveraged for relatively fast and accurate network problem localization and alerting.

For certain example embodiments, a general inference system is described. An inference system can provide IT administrators tools to localize performance degradation issues as well as hard failures that can affect an end-user. An example inference implementation can: (1) detect the existence of hard faults and performance degradations by monitoring the response times of service requests; (2) determine a set of components that might be responsible for a given hard fault or performance degradation; and/or (3) localize the network problem to the most likely component(s) using probabilistic techniques. The portions of an example inference system that are described extensively herein pertain primarily to constructing an inference graph that may be used for network problem localization.

A number of challenges may be confronted when implementing an inference system. Three example challenges follow. First, even relatively simple requests like fetching a webpage involve multiple services, such as DNS servers, authentication servers, web-servers, and the backend SQL databases that hold the web-page data. Problems at any of these servers can affect the success or failure of the request. Unfortunately, the dependencies among different components in IT systems are typically not documented anywhere, and they evolve continually as systems grow or new applications are added. Nevertheless, an example embodiment of an inference system is able to automatically discover the set of components involved in the processing of requests.

Second, both performance degradations and hard faults can stem from problems anywhere in the IT infrastructure, i.e., a service, a router, a link, and so forth. Therefore, while there is some value in using an inference graph to monitor the services and the network elements separately, additional information and/or accuracy can be achieved by correlating their interdependencies. Consequently, an example embodiment of an inference system is capable of operating across both service and network layers simultaneously. Third, failover and load-balancing techniques commonly used in enterprise networks make determining the responsible component even more difficult because the set of components involved with a requested service may change from request to request. Consequently, an example embodiment of an inference system enables such failover and load-balancing techniques to be modeled as part of the inference graph.

In an example embodiment of an inference system, a number of aspects may be implemented. First, software agents of the inference system may run on each endhost to analyze the packets that the endhost sends and receives so as to determine the set of services that the endhost depends on. The agent may also track the distribution of response times experienced for each service with which the endhost communicates, fit a Gaussian model to the empirical data, and generate notifications when a response time falls outside the nominal range. Second, the inference system may combine the individual views of dependency computed by each endhost (e.g., and realized as a service-level dependency graph) to assemble an inference graph. The inference graph can capture the dependencies between each of the components of the IT network infrastructure. This inference graph can be a multi-level graph so as to represent the multiple levels of dependencies that are found in a typical IT network infrastructure, for example, as servers depend on other servers.

The inference system can use information provided by one or more endhosts to fill in any gaps in the dependency information that is reported from another endhost. When constructing the inference graph, the inference system may augment it with information about the routers and links used to carry packets between endhosts. The inference system can therefore encode in a single model each of the components of a network that can affect a service request. The inference graph can then be used by the inference system along with agent observations to localize network problems. Third, in addition to the aspects described above that can be performed automatically, network operators may be empowered to incorporate into the inference graph model the load-balancing and failover mechanisms that are present in their networks.

To focus on performance degradations as well as hard faults, certain described embodiments of inference systems address problems that affect the users of the IT infrastructure by using monitored response times as indicators of performance degradations. This can mitigate an issue with current management approaches in which operators are overwhelmed with many, relatively meaningless, alerts that report parameter-based overloading situations that may not even directly affect users. In contrast, example inference systems as described herein usually generate alarms in response to user-perceptible network problems, including performance degradations or hard faults. An aspect of an example approach to recognizing user-perceptible performance degradations pertains to characterizing components in terms of three potential states (e.g., up, down, or troubled). These three states are described further herein below with particular reference to FIG. 4.

In the following sections, example general principles for inference systems and inference graphs are described with particular reference to FIGS. 1-8. FIGS. 9-13 are referenced to describe the determination of service dependencies and the building of service-level dependency graphs. The construction of an inference graph from the service-level dependency graphs is described with particular reference to FIGS. 14 and 15. A general device that may be used to implement embodiments for constructing an inference graph is described with reference to FIG. 16.

EXAMPLE EMBODIMENTS FOR CONSTRUCTING AN INFERENCE GRAPH

1: Introduction—Example Environments and Overview

FIG. 1 is a block diagram of an example network 100 that may be used in conjunction with constructing an inference graph. As illustrated, network 100 includes multiple servers 102, multiple clients 104, and multiple network elements 106. Specifically, three servers 102a, 102b, and 102c; two clients 104a and 104b; and six network elements 106a, 106b, 106c, 106d, 106e, and 106f are shown and identified by reference numeral. As indicated by the ellipses, a network 100 may include more (or fewer) components than those that are illustrated in FIG. 1; also, the components may be arranged in different topologies.

In an example embodiment, each of servers 102 participates in providing one or more services. A service is some functionality provided by one or more endhosts. A service may be defined within a network and/or for a given inference system embodiment in any manner. By way of example, a service may be defined as an (IPaddress, port) pair. However, many alternative definitions of a service are possible. For example, a service may be defined as all of the messages sent and received by processes with a particular name or executable running on endhost(s). As another example, a service may be defined as the messages recognized by a packet parser (such as NetMon, Ethereal, WireShark, etc.) as part of the same protocol suite or application (e.g., Hyper Text Transfer Protocol (HTTP), Network Time Protocol (NTP), NETBIOS, Remote Procedure Call (RPC), Server Message Block (SMB), etc.). An inference system may also use any combination of such definitions as a service. Each client 104 is an endhost that may request a service from a server 102. Network elements 106 may be machines such as routers and switches (e.g., network elements 106a,b,c) or links such as wireless or wired transmission media (e.g., network elements 106d,e,f). An example taxonomy for network components that further elaborates on the terminologies of and interrelationships between these components is described further herein below with particular reference to FIG. 3.

Figure 2:
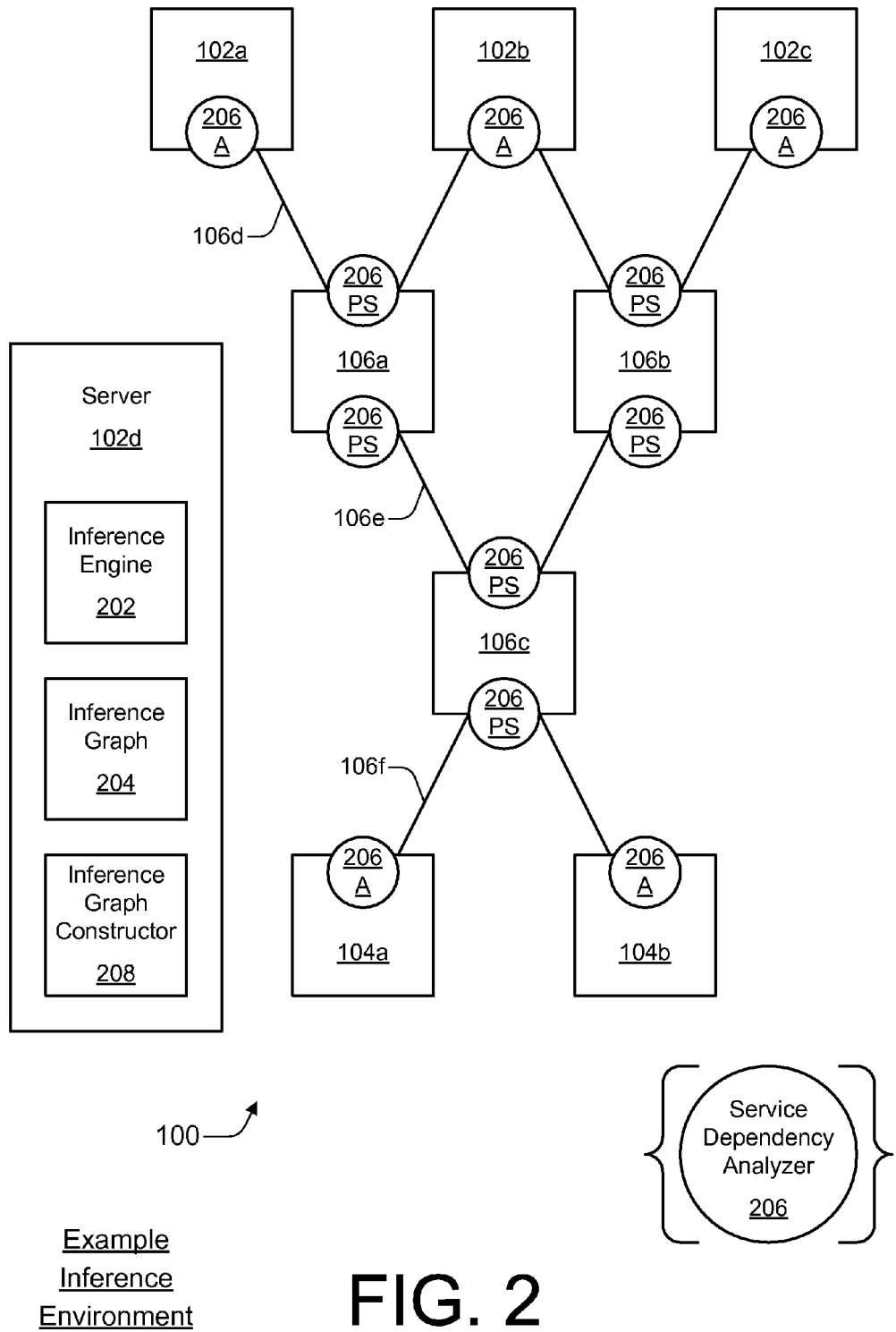
FIG. 2 is a block diagram of a network that illustrates an example inference environment for constructing an inference graph.

FIG. 2 is a block diagram of network 100 illustrating an example inference environment for constructing an inference graph. As illustrated, network 100 includes servers 102a-c, clients 104a-b, and network elements 106a-f. Network 100 also includes in FIG. 2 a server 102d, an inference engine 202, an inference graph 204, multiple service dependency analyzers 206, and an inference graph constructor 208. A service dependency analyzer 206 is realized as a service dependency analyzer agent 206A when it is implemented at endhosts such as servers 102 or clients 104. A service dependency analyzer 206 is realized as a service dependency analyzer packet sniffer 206PS when it is implemented at network elements 106 such as routers and switches. It should be understood that a service dependency analyzer packet sniffer 206PS may also be implemented at, including proximate to, the endhosts as well as the network elements. It should be noted that embodiments for constructing an inference graph may be implemented without using packet sniffers 206PS (e.g., by using agents 206A) and vice versa, as well as by using both packet sniffers 206PS and agents 206A. Other alternative embodiments for service dependency analyzers 206 may also be implemented.

In an example embodiment, inference graph constructor 208 constructs an inference graph 204 at server 102d. A portion of an example inference graph 208 is described herein below with particular reference to FIG. 6. An inference engine 202 may use a constructed inference graph 204 to probabilistically determine at least one likely cause of one or more user-perceivable network problems. Although shown in FIG. 2 as being located at a single server 102d, inference engine 202 and inference graph constructor 208 may be implemented in alternative manners. For example, their operation and/or the construction of inference graph 204 may be effectuated in a distributed manner, such as at all or a portion of service dependency analyzers 206, at servers 102, at clients 104, some combination thereof, and so forth. Also, although shown separately in FIG. 2, any of inference engine 202, service dependency analyzers 206, and/or inference graph constructor 208 may be integrated together into fewer total units or may be separated into a greater number of modular units.

As is introduced above and described further herein below, network dependencies may be inferred at least partly by monitoring messages that are communicated between endhosts. These messages are monitored by obtaining packet traces for packets communicated between the endhosts. Service dependency analyzers 206 are responsible for obtaining packet traces for the packets that are exchanged between the endhosts. In short, network dependencies may be captured based on monitored messages with the obtained packet traces. Service-level dependency graphs may be built from the captured dependencies, and an inference graph may be constructed using the service-level dependency graphs. Example embodiments for obtaining packet traces, building service-level dependency graphs, and constructing an inference graph are described herein below with particular reference to FIGS. 9-15.

Figure 3:
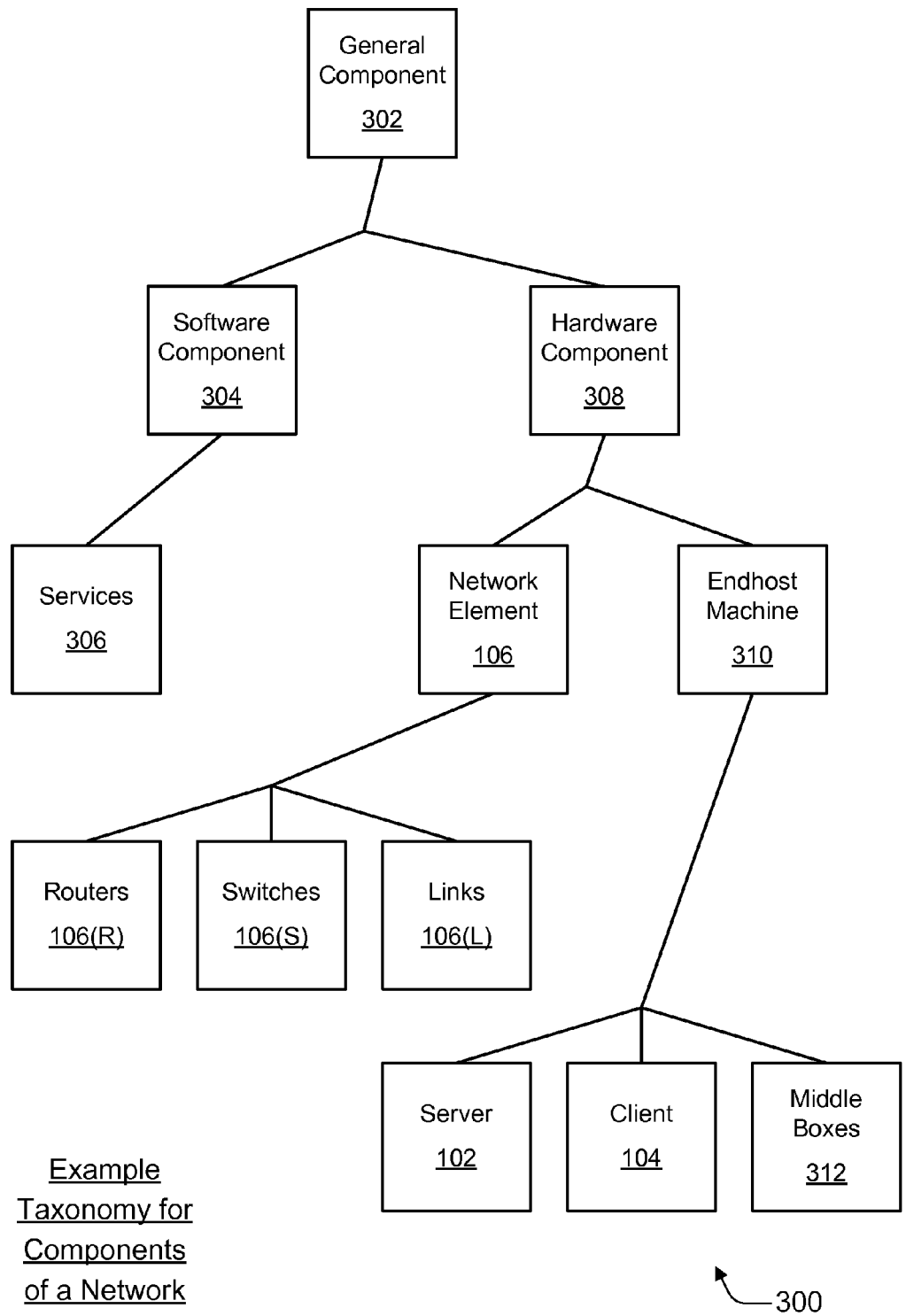
FIG. 3 illustrates an example taxonomy for components of a network.

FIG. 3 illustrates an example taxonomy 300 for components of a network, such as network 100. Example taxonomy 300 indicates that network 100 is formed from multiple general components 302. General components 302 may be, for example, software components 304 or hardware components 308. An example of a relevant software component 304 is one or more services 306, including the applications that execute on devices to provide the services. A service 306 may be implemented by software that is running on one, two, or more endhosts.

Hardware components 308 may be realized as one or more devices, an example of which is described herein below with particular reference to FIG. 16. Examples of hardware components 308 include network elements 106 and endhost machines 310. Examples of network elements 106 include routers 106(R), switches 106(S), and links 106(L). Examples of endhost machines 310 include servers 102, clients 104, and middle boxes 312. Other alternative components, which are not specifically illustrated, may also fit into component taxonomy 300. For instance, a hub may be a network element 106.

Figure 4:
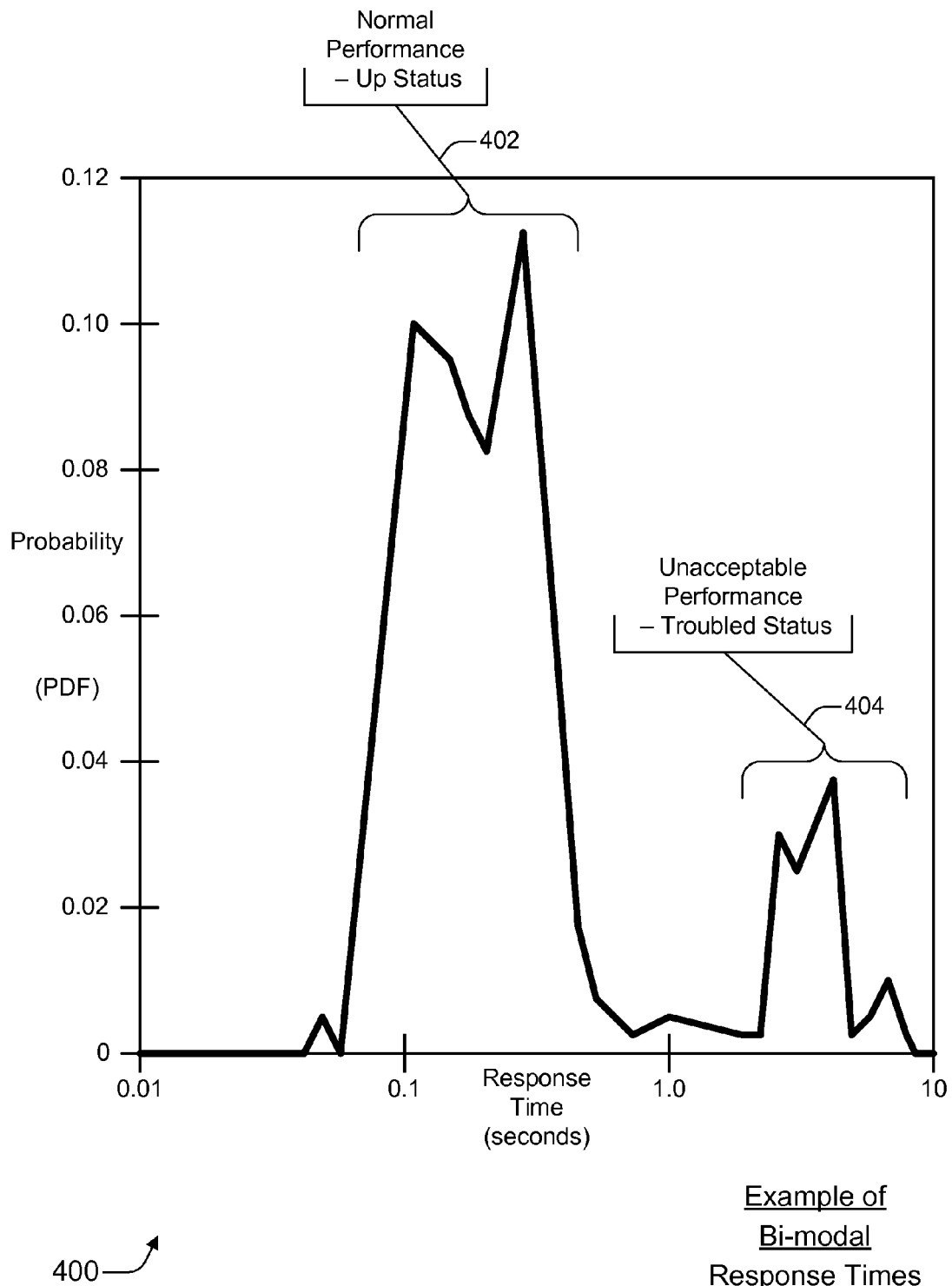
FIG. 4 is a graph that illustrates an example of bi-modal response times for a request.

FIG. 4 is a graph 400 that illustrates an example of bi-modal response times for a request. Graph 400 includes a horizontal abscissa axis that shows response times logarithmically from 0.01 to 10 and a vertical ordinate axis that shows probabilities from 0 to 0.12 (0 to 12%). Graph 400 illustrates a distribution of times consumed while clients fetched the home page from a major web server of a large enterprise. The distribution is plotted from a data set of 18,000 samples from 23 instrumented clients over a period of 24 days in a large enterprise network that includes tens of thousands of network elements and over four hundred thousand endhosts.

As is apparent from a review of graph 400, the times are bi-modal. Thirteen percent of the requests take 10× longer than normal, which results in user-perceptible lags of 3 to 10+ seconds. As is shown at 402, the first response time mode is indicated to be that the service is considered up with a normal performance. As is shown at 404, the second response time mode is indicated to be that the service is considered troubled with an unacceptable performance.

Conventional network management systems treat each service as being either up or down. This relatively naive model hides the kinds of performance degradations evidenced by the second response time mode at 404 of graph 400. To account for these types of lengthy delays that can qualify as user-perceptible network problems, certain example embodiments of the inference system model service availability as a tri-state value. This tri-state value for a service can be: up when its response time is normal; down when requests result in an error status code or no response at all; and troubled when responses fall significantly outside of normal response times. A response may be considered to fall significantly outside of normal response times when it is an order of magnitude greater than normal, when it exceeds a few seconds, when it is sufficiently long so as to annoy or inconvenience users, when it fails to meet a targeted temporal performance goal but does provide a correct response, some combination thereof, and so forth. Thus, a service may be assigned a troubled status when only a subset of service requests is performing poorly.

2: Example Aspects of Inference Graph Embodiments

In an example embodiment, an inference graph is a labeled, directed graph that provides a unified view of the dependencies in a network, with the graph spanning both service and hardware network components. The structure of the dependencies is multi-level.

2.1: Example Inference Graph Aspects

Figure 5:
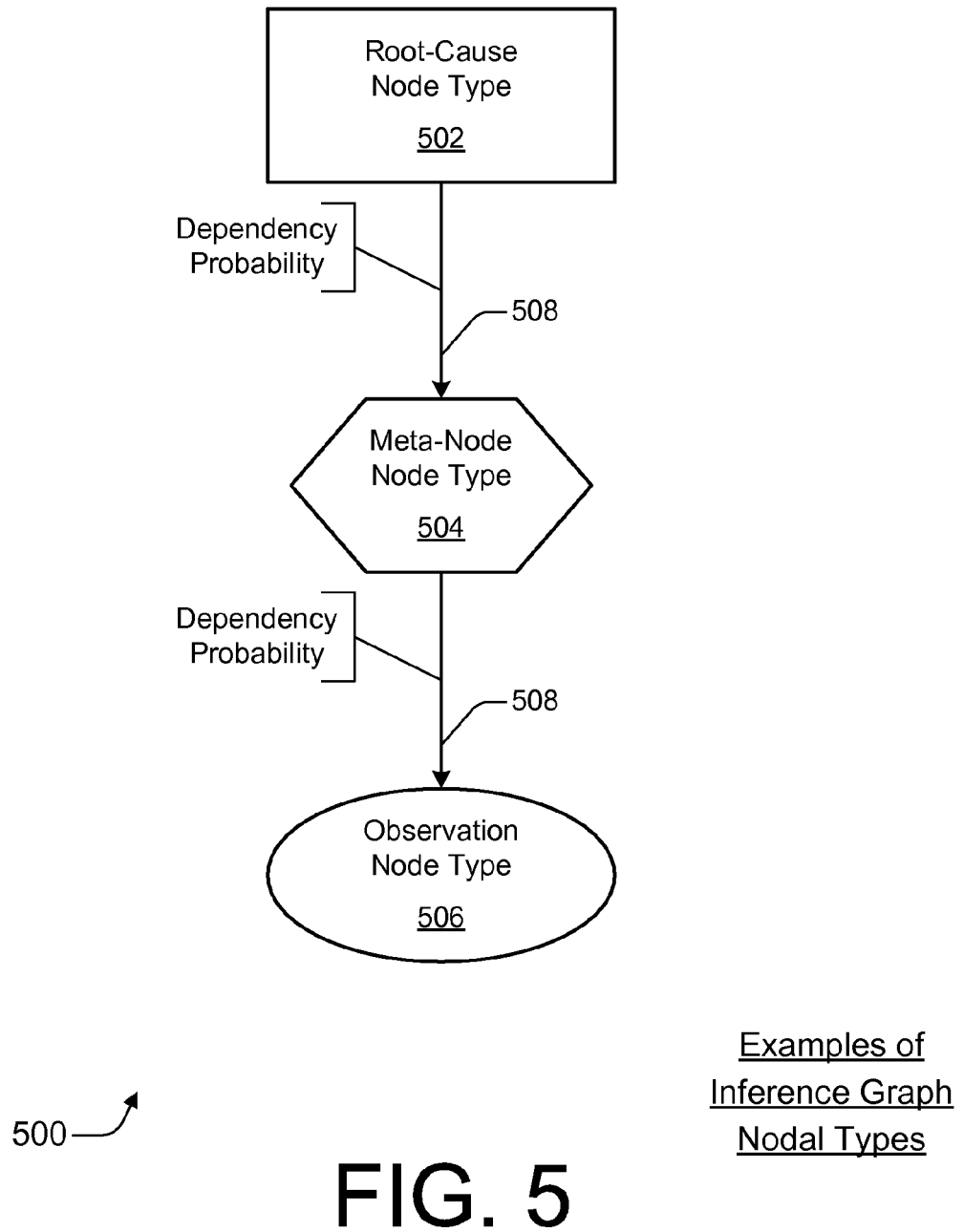
FIG. 5 is a block diagram of three example nodal types for an inference graph.

FIG. 5 is a block diagram 500 of three example nodal types 502-506 for an inference graph. As illustrated, diagram 500 includes a root-cause node type 502, a meta-node node type 504, and an observation node type 506. For visual clarity, root-cause node types 502 are shown as rectangles, meta-node node types 504 are shown as hexagons, and observation node types 506 are shown as ovals. Edges 508 interconnect the various nodes. Each edge 508 may be associated with a dependency probability. Dependency probabilities are described further below.

Thus, in an example embodiment, nodes in an inference graph are of three types 502, 504, and 506. First, root-cause nodes 502 correspond to physical components or services whose failure can cause an end-user to experience failures (e.g., a network problem such as a performance degradation, a hard fault, etc.). The granularity of root-cause nodes may be a computer (e.g., a machine with an IP address), a router or an IP link, and so forth. Alternatively, implementations of an inference system may employ root causes having a finer granularity.

Second, observation nodes 506 represent accesses to network services whose performance can be measured by the inference system. There can be a separate observation node for each client that accesses any such network service. The observation nodes thus model a user's experience when using services on the network. Observation nodes 506 can also represent other measurements made of components in the network. For example, an observation node can represent the utilization of a network link: reporting an up state when the link utilization is below 50%, reporting a troubled state when the link utilization is above 50%, and reporting a down state when the link is down. Thus, each observation node may correspond to at least one measurable quantity of the network. Examples of measurable quantities include, by way of example but not limitation, response time, link utilization, machine room temperature, some combination thereof, and so forth.

Third, meta-nodes 504 act as glue between the root-cause nodes and the observation nodes. Three types of meta-nodes are described herein: noisy-max, selector, and fail-over. However, meta-nodes may have more, fewer, and/or different types. These meta-nodes model the dependencies between root causes and observations. Meta-nodes are described further herein below, especially in Section 2.2 "Probabilistic Modeling for Meta-Nodes".

The state of each node in an inference graph is expressed probabilistically by a three-tuple: $(P_{up}, P_{troubled}, P_{down})$ $P_{up}$ denotes the probability that the node is working normally. $P_{down}$ is the probability that the node has experienced a fail-stop failure, such as when a server is down or a link is broken. Third, $P_{troubled}$ is the probability that a node is troubled, as described herein above, wherein services, physical servers or links continue to function but users perceive relatively poor performance. The sum of $P_{up}+P_{troubled}+P_{down}=1$. It should be noted that the state of a root-cause node is independent of any other root-cause nodes in the inference graph and that the state of observation nodes can be predicted from the state of their ancestors.

An edge 508 from a node A to a node B in an inference graph encodes the dependency that node A has to be in an up or other state for node B to also be in the up or other state. In other words, an edge 508 from a node A to a node B indicates that the state of node A affects the state of node B. Equivalently, this indication can be expressed as the state of B depends on the state of A. Edges 508 may also be labeled with a dependency probability that encodes the strength of the dependency of B on A. Thus, an edge from a first node A to a second node B encodes a probabilistic dependency that indicates how likely it is that a state of the first node A affects a state of the second node B.

Not all dependencies need be equal in strength. For example, a client cannot access a file if the path(s) to the file server are down. However, the client may be able to access the file even when the DNS server is down if the file server name is resolved using the client's local DNS cache. Furthermore, the client may need to authenticate more (or less) often than resolving the server's name. To capture varying strengths of such dependencies, edges 508 in an inference graph are associated/labeled with a dependency probability (DP). A larger dependency probability indicates a stronger dependence.

Figure 6:
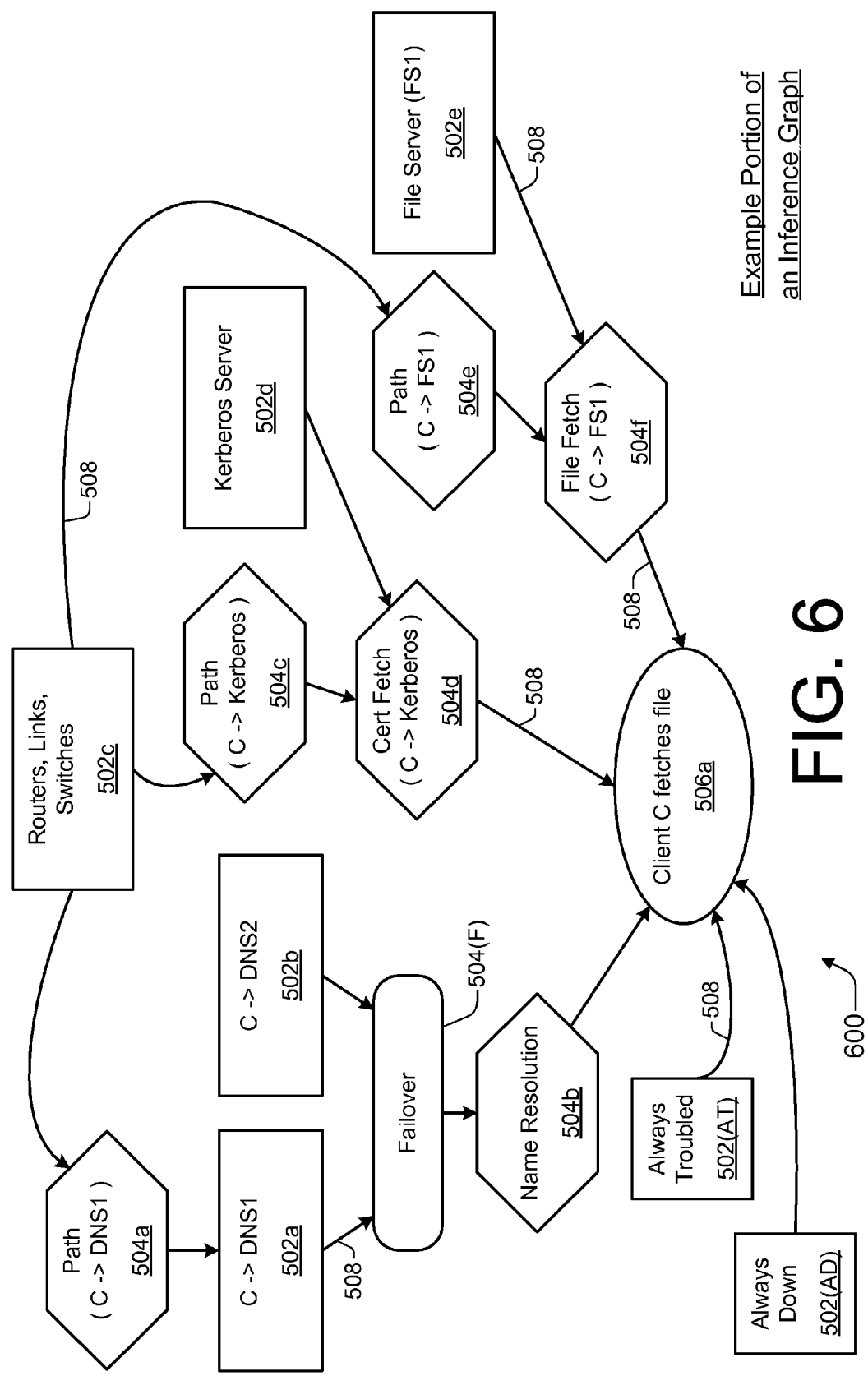
FIG. 6 is a block diagram of an example portion of an inference graph that reflects the dependencies involved when accessing a file share.

FIG. 6 is a block diagram of an example portion of an inference graph 600 that reflects the dependencies involved when accessing a network file share. The access to the file depends on contacting a Kerberos server for authentication, which in turn depends on the Kerberos server itself, as well as routers, switches, links, etc. on the path from the user's machine to the Kerberos server. A problem can occur anywhere in this chain of dependencies. These dependencies are modeled in an example framework of observation nodes, meta-nodes, and root-cause nodes that can be feasibly automated.

As illustrated, inference graph portion 600 (e.g., of an inference graph 204 (of FIG. 2)) includes a number of nodes and edges. Specifically, five root-cause nodes 502a-502e, six meta-nodes 504a-504f, one observation node 506a, and multiple edges 508 are shown. Only some of the edges are designated by the reference numeral 508 for the sake of visual clarity. Two special root-cause nodes 502(AT) and 502(AD) are also shown. Thus, rectangles represent physical components and the software services executing thereon, the oval represents an external observation, the hexagons model potential points of failure, and the square rectangles represent un-modeled or other external factors.

More specifically, in an example embodiment, each inference graph has two special root-cause nodes 502: always troubled 502(AT) and always down 502(AD). These special root-cause nodes 502(AT) and 502(AD) are to model external factors that might cause a user-perceived failure and that are not otherwise a part of the model. The state of the always troubled node 502(AT) is set to (0, 1, 0), and the state of the always down node 502(AD) is set to (0, 0, 1). An edge from each of these special root-cause nodes 502(AT) and 502(AD) is included to each of the observation nodes 506. The probabilities assigned to these edges are described herein below.

In inference graph portion 600, the fetching of a file from a network file server by a user at client C is modeled. The user activity of "fetching a file" is encoded as an observation node 506a because the inference system can determine the response time for this action. In this example, fetching a file involves the user performing three actions: (i) authenticating itself to the network via Kerberos, (ii) resolving the DNS name of the file server via a DNS server, and (iii) accessing the file server. These actions themselves can also depend on other events and/or components to succeed. Consequently, these actions are modeled as meta-nodes 504b/d/f, and edges are added from each of them to the observation node 506a of "fetching a file".

Generally, parent nodes are recursively constructed for each meta-node 504, and corresponding edges are added until the associated root-cause nodes 502 are reached. Examples of meta-nodes 504 include: paths-between-endhost-machines meta-nodes 504a, 504c, and 504e; name resolution meta-node 504b; certificate fetch meta-node 504d; and file fetch meta-node 504f. Examples of root-cause nodes 502 include: DNS servers 502a and 502b; routers, switches, and links 502c on paths to the servers; the Kerberos authentication server 502d; and the targeted file server 502e. To model a failover mechanism in domain name resolution between the two DNS servers DNS1 and DNS2, a fail-over meta-node 504(F) is introduced.

It should be noted that FIG. 6 illustrates a portion 600 of an inference graph. Thus, a complete inference graph may include accesses made to other network services by the same user at client C as well as accesses to the illustrated file service (and other services) by other users at other clients in the network. Each access to a different service from an individual client and/or user may correspond to a separate observation node 506 in the complete inference graph. An example method for computing dependency probabilities for edges 508 is described herein below in Section 3.1 "Discovering Service-Level Dependencies" with particular reference to FIGS. 11A, 11B, and 12.

2.2: Probabilistic Modeling for Meta-Nodes

With a probabilistic model, the states of parent nodes probabilistically govern the state of a child node. For example, suppose a child has two parents, A and B. The state of parent A is (0.8, 0.2, 0), i.e. its probability of being up is 0.8, troubled is 0.2, and down is 0. The state of parent B is (0.5, 0.2, 0.3). A question then is: what is the state of the child? While the probability dependencies of the edge labels encode the strength of the dependence, the nature of the dependency is encoded in the meta-node. For an example embodiment, the meta-node provides or describes the state of the child node given the state of its parent nodes (and the relevant dependency probabilities).

Figure 7A:
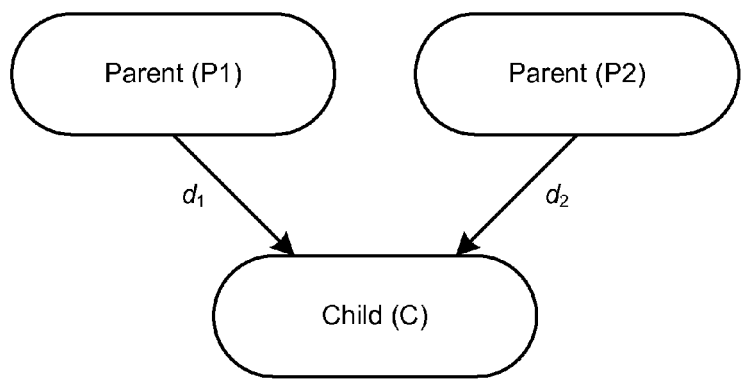
FIGS. 7A-7C illustrate three different example versions of a meta-node inference graph nodal type.
Figure 7B:
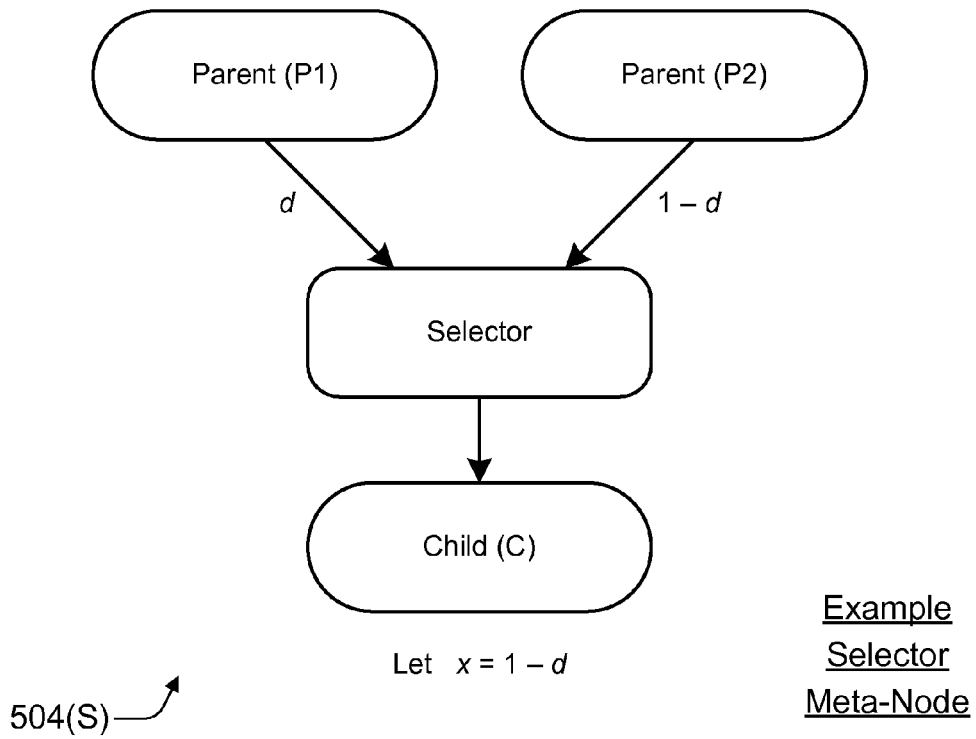
Figure 7C:
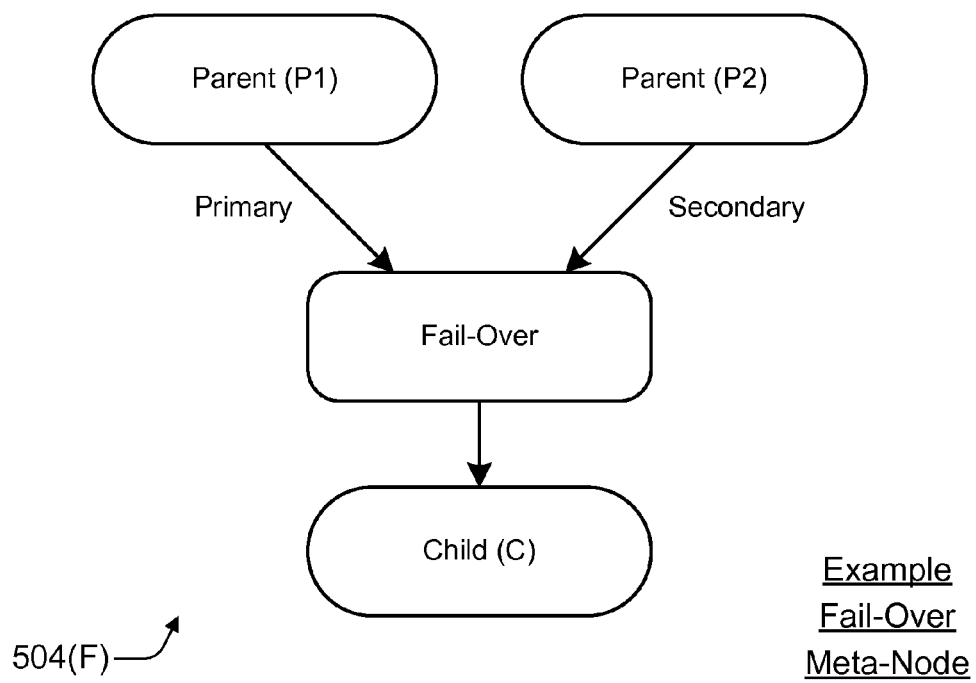

FIGS. 7A-7C illustrate three different example versions of a meta-node inference graph nodal type 504 (from FIG. 5). FIG. 7A illustrates an example noisy-max meta-node 504(N). FIG. 7B illustrates an example selector meta-node 504(S). FIG. 7C illustrates an example fail-over meta-node 504(F). Example embodiments for each of these meta-nodes 504(N), 504(S), and 504(F) are described below. Although each meta-node 504 is shown as having exactly two parents, each may alternatively have a different number of parents.

With reference to FIG. 7A, noisy-max meta-node 504(N) includes two parents: parent P1 and parent P2. It also includes a child C as well as two dependency probabilities: $d_1$ and $d_2$. The following variable assignments are given: $x=1-d_1$ and $y=1-d_2$. Noisy-max meta-node 504(N) may be understood conceptually as follows. "Max" implies that if any of the parents are in the down state, then the child is down. If no parent is down and any parent is troubled, then the child is troubled. If all parents are up, then the child is up. "Noise" implies that the dependency probability on the edge dictates the likelihood with which a parent's state affects the child's state. If the edge's weight is d, then the child is not affected by its parent with probability (1−d). Thus, noisy-max combines the notions of both "noisy" and "max".

Table 1 below presents a truth table for a noisy-max meta-node 504(N) when a child has two parents. Each of the two parents P1 and P2 can be up, troubled, or down. This results in a 3×3 grid as follows:

TABLE 1

Noisy-Max Meta-Node Truth Table.

| Noisy-Max | P1 Up | P1 Troubled | P1 Down |
|---|---|---|---|
| P2 Up | 1, 0, 0 | x, 1 − x, 0 | x, 0, 1 − x |
| P2 Troubled | y, 1 − y, 0 | xy, 1 − xy, 0 | xy, x(1 − y), 1 − x |
| P2 Down | y, 0, 1 − y | xy, (1 − x)y, (1 − y) | xy, 0, 1 − xy |

Each entry in the truth table of Table 1 is the state of the child, i.e. its probability of being up, troubled, or down when parent P1 and parent P2 have states as per the column and row labels, respectively. For instance, a troubled label for parent P1 implies that its state is (0, 1, 0). As an example of the truth table grid, the second row and third column of the truth table can be used to determine the probability of the child being troubled, given that parent P1 is down and parent P2 is troubled (P(Child=Troubled|ParentP1=Down, ParentP2=Troubled)) is $(1-d_1)*d_2$. To explain this intuitively, the child will be down unless parent P1's state is masked by noise (prob $1-d_1$). Further, if both parents are masked by noise, the child will be up. Hence, the child is in the troubled state only when parent P1 is drowned out by noise and parent P2 is not. Other grid entries can be similarly understood.

With reference to FIG. 7B, selector meta-node 504(S) includes two parents (parent P1 and parent P2), a child C, and two dependency probabilities (d and 1−d). It also includes a "Selector" indicator block. The following variable assignment is given: x=1−d. The selector meta-node is used to model load balancing scenarios. For example, a network load balancer (NLB) in front of two servers may hash the client's request and distribute requests evenly to the two servers. Attempting to model this scenario using a noisy-max meta-node does not produce a correct result. With a noisy-max meta-node, the child would depend on each server with a probability of 0.5 because half the requests go to each server. Thus, the noisy-max meta-node would assign the client a 25% chance of being up even when both the servers are troubled, which is clearly not accurate.

Generally, the selector meta-node can be used to model a variety of NLB schemes. For example, selector meta-nodes can model NLB servers, equal cost multipath (ECMP) routing, and so forth. ECMP is a commonly-used technique in enterprise networks in which routers send packets to a destination along several paths. A path with ECMP may be selected based on the hash of the source and destination addresses in the packet.

Table 2 below presents a truth table for a selector meta-node 504(S) when a child has two parents. Each of the two parents P1 and P2 can be up, troubled, or down. A child node selects parent P1 with probability d and parent P2 with probability 1−d. The child probabilities for the selector meta-node are as presented in Table 2 below:

TABLE 2

Selector Meta-Node Truth Table.

| Selector | P1 Up | P1 Troubled | P1 Down |
|---|---|---|---|
| P2 Up | 1, 0, 0 | x, 1 − x, 0 | x, 0, 1 − x |
| P2 Troubled | 1 − x, x, 0 | 0, 1, 0 | 0, x, 1 − x |
| P2 Down | 1 − x, 0, x | 0, 1 − x, x | 0, 0, 1 |

The grid entries in the selector meta-node truth table above express the selection made by the child. For example, if the child may choose each of the parents with an equal probability of 50%, selector meta-node 504(S) causes the child to have a zero probability of being up when both its parents are troubled. This is discernable from the first number "0" in the P2 troubled row, P1 troubled column entry.

With reference to FIG. 7C, fail-over meta-node 504(F) includes two parents (parent P1 and parent P2), a child C, and two edge labels (primary and secondary). It also includes a "Fail-over" indicator block. Fail-over meta-nodes embrace the fail-over mechanisms commonly used in enterprise networks (e.g., with servers). Fail-over is a redundancy technique where clients access primary production servers and fail-over to backup servers when the primary server is inaccessible. Fail-over cannot be accurately modeled by either the noisy-max or selector meta-nodes because the probability of accessing the backup server depends on the failure of the primary server.

Table 3 below presents a truth table for a fail-over meta-node 504(F) when a child has two parents. Each of the two parents P1 and P2 can be up, troubled, or down. The truth table for the fail-over meta-node encodes the dependence when the child primarily contacts parent P1, but fails over to parent P2 when parent P1 does not respond. The child probabilities for the fail-over meta-node are as presented in Table 3 below:

TABLE 3

Fail-Over Meta-Node Truth Table.

| Fail-Over | P1 Up | P1 Troubled | P1 Down |
|---|---|---|---|
| P2 Up | 1, 0, 0 | 0, 1, 0 | 0.9, 0.1, 0 |
| P2 Troubled | 1, 0, 0 | 0, 1, 0 | 0, 1, 0 |
| P2 Down | 1, 0, 0 | 0, 1, 0 | 0, 0, 1 |

For a fail-over meta-node 504(F), as long as the primary server (parent P1) is up or troubled, the child is not affected by the state of the secondary server (parent P2). When the primary server is in the down state, the child has a high chance of being up if the secondary server is up. Also, in this case (primary down, secondary up) the child has a small chance of being troubled as it expends time accessing the primary server, which is down, before falling back to the secondary server. These permutations are reflected by the probabilities in Table 3. For example, if the primary server (parent P1) is down and the secondary server (parent P2) is up at the first row and third column, the (up, troubled, down) probabilities are (0.9, 0.1, 0).

Other versions of the truth tables of Tables 1, 2, and 3 may alternatively be implemented. For example, the P1 down, P2 up entry of the fail-over meta-node truth table may be (1, 0, 0) instead of (0.9, 0.1, 0). Additionally, it should be understood that the meta-nodes of an inference graph may be merged into other nodes in the graph. For example, with reference to FIG. 5, meta-node 504 may be merged into observation node 506 by incorporating the probability table for the meta-node 504 into the observation node 506.

2.3: Example Architecture for Inference System

Figure 8:
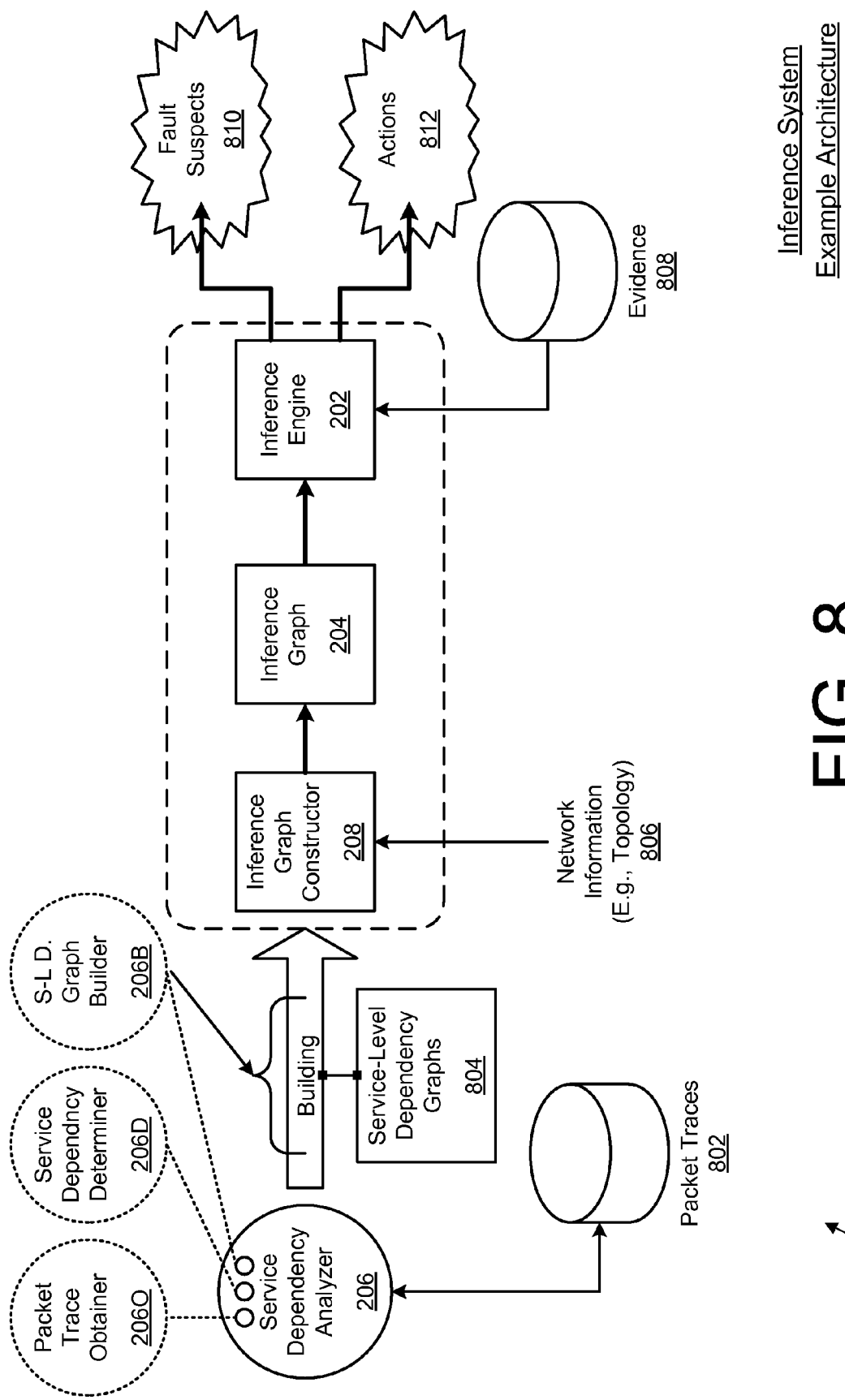
FIG. 8 is a block diagram illustrating an example inference system architecture.

FIG. 8 is a block diagram illustrating an example inference system architecture 800. As illustrated, inference system architecture 800 includes at least one service dependency analyzer 206, an inference graph constructor 208, an inference graph 204, and an inference engine 202 (each also of FIG. 2). Inference system architecture 800 further includes packet traces 802, service-level dependency graphs 804, network information 806, client evidence 808, fault suspects 810, and actions 812.

In an example embodiment, an inference system includes a centralized inference engine 202 and distributed service dependency analyzers 206. Each service dependency analyzer 206 may include a packet trace obtainer 206O, a service dependency determiner 206D, and/or a service-level dependency graph builder 206B. An inference system may be implemented without changing the routers or switches, the applications, and/or the middleware of a given enterprise or other institution. An inference system may also be implemented in alternative manners.

Generally, an example inference system deployment that is capable of analyzing network symptoms and diagnosing network problems can implement a three-step process to localize faults in a network. First, each service dependency analyzer 206 is responsible for monitoring the packets sent from and received by one or more endhosts to obtain packet traces 802. Packet traces 802 may be obtained by packet trace obtainer 206O. Each service dependency analyzer 206 may run on an endhost itself (as an agent 206A), or it may obtain packet traces via sniffing a nearby link or router (as a packet sniffer 206PS). From these packet traces 802, each service dependency analyzer 206 computes the dependencies between the services with which its endhost(s) communicates and the response time distributions for each specified service. The service dependencies may be computed by service dependency determiner 206D. A service-level dependency graph builder 206B builds service-level dependency graphs 804 from the computed service dependency information. The service-level information of these dependency graphs 804 is then relayed to inference graph constructor 208. Alternatively, service-level dependency graph builder 206B may be part of inference graph constructor 208, and/or inference graph 204 may be constructed directly from the service-level dependency information.

Second, a network operator specifies the services that are to be monitored (e.g., by IP address and port number). Inference graph constructor 208 aggregates the dependencies between the services as computed by each of the service dependency analyzers 206 and may employ statistical procedures to detect false positives and/or false negatives. The former can be rejected and probabilistically-estimated values for either can be incorporated into the inference graph. Inference graph constructor 208 combines the aggregated dependency information with network information 806 (e.g., network topology information) to compute a unified inference graph 204. The unified inference graph 204 pertains to each of the service activities in which the operator is interested and represents information collected across each of the service dependency analyzers 206.

Third, ongoing client response time evidence 808 that is collected by service dependency analyzers 206 is provided to inference engine 202. Evidence 808 may also be client-server interaction logs; trouble tickets; Simple Network Management Protocol (SNMP) counters; event logs from clients, servers, or network elements (e.g., syslog); combinations thereof; and so forth. Inference engine 202 analyzes evidence 808 given the current inference graph 204. In other words, inference engine 202 applies the response time evidence observations 808 reported by service dependency analyzers 206 to inference graph 204 to attempt to identify fault suspects 810 (e.g., the root-cause node(s) for links, routers, servers, clients, etc.) that are responsible for any observed network problems. Inference engine 202 may also provide suggested actions 812 (e.g., running trace routes, analyzing a particular server, etc.) for remedying the network problems that are potentially caused by fault suspects 810. The first and second steps may be executed periodically or when triggered by a change in a dependency so as to capture and incorporate any changes in the network. The third step may be executed periodically, when requested by an operator, or when prompted by a service dependency analyzer 206 that is observing relatively longer response times.

3: Example Inference Graph Construction Embodiments

Figure 9:
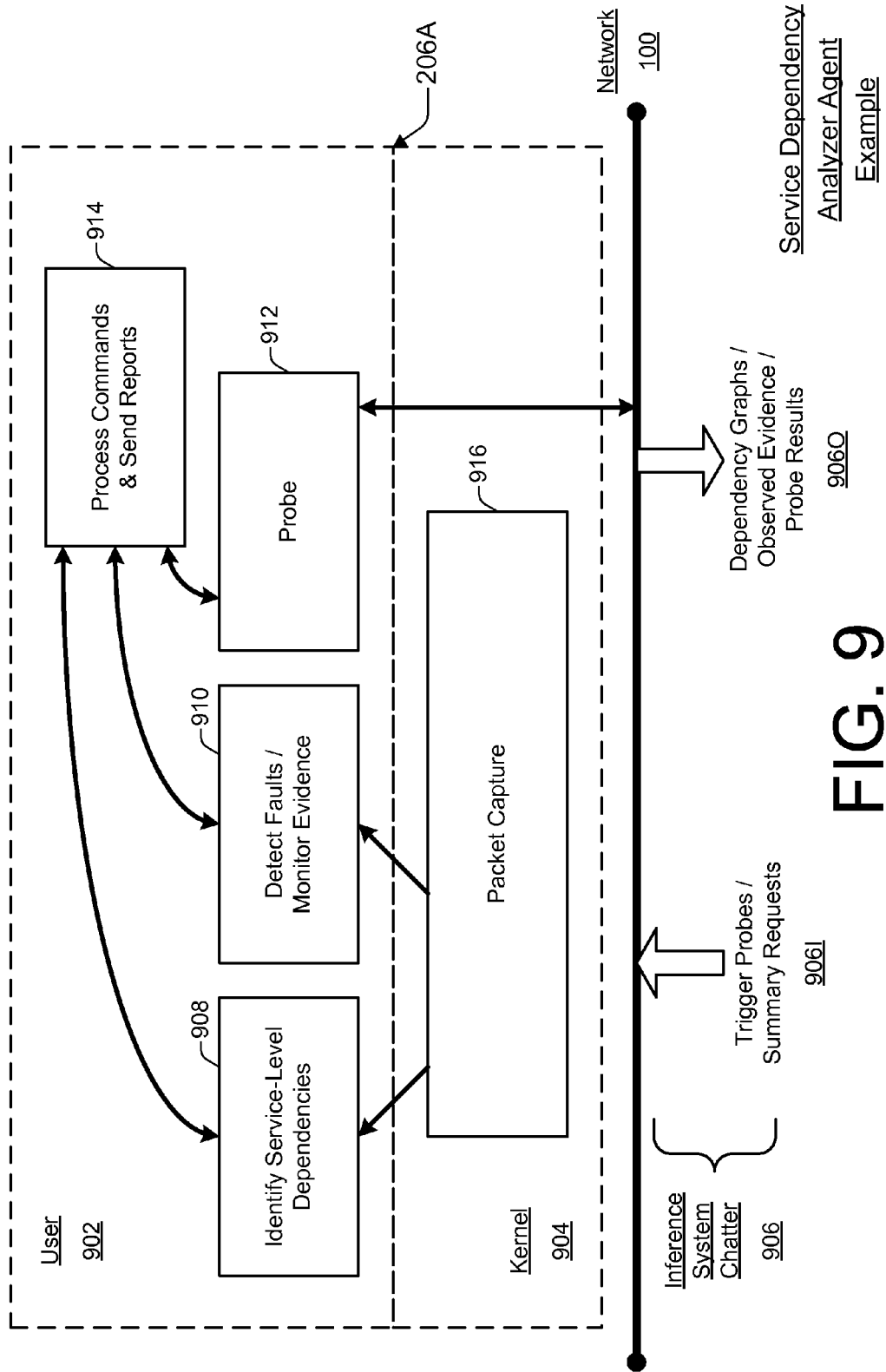
FIG. 9 is a block diagram of an example service dependency analyzer agent that may be used in conjunction with the construction of an inference graph.

FIG. 9 is a block diagram of an example service dependency analyzer agent 206A that may be used in conjunction with the construction of an inference graph. As illustrated, service dependency analyzer 206A includes a user portion 902 and a kernel portion 904. User portion 902 includes four blocks 908, 910, 912, and 914. Kernel portion 904 includes one block 916.

In an example embodiment, service dependency analyzer 206A communicates with network 100 (of FIGS. 1 and 2) and observes packets being transmitted over it. Inference system chatter 906 is communicated across network 100. Inference system chatter 906 includes incoming inference system chatter 906I and outgoing inference system chatter 906O. Incoming inference system chatter 906I includes requests for trigger probes, summary requests, and so forth. Outgoing inference system chatter 906O includes dependency graphs, observed evidence, probe results, and so forth.

Packet capture unit 916 is responsible for obtaining packets traces from network 100. Packet capture unit 916 is an example of a unit that may be used to implement at least part of a packet trace obtainer 206O (of FIG. 8). The obtained packet traces are passed to an identify service-level dependencies unit 908 and a detect faults/monitor evidence unit 910. Identify service-level dependencies unit 908 may be used to implement at least part of service dependency determiner 206D and/or service-level dependency graph builder 206B. Detect faults/monitor evidence unit 910 may monitor incoming performance evidence and detect when services become troubled or down. Units 908 and 910 communicate with process commands and send reports unit 914. Process commands and send reports unit 914 controls unit 908, unit 910, and probe unit 912, which performs probes over network 100.

Service dependency analyzer 206A may be implemented, for example, as a user-level service (daemon) in a MICROSOFT® WINDOWS® operating system. Packet capture unit 916 may use WinPCAP, NetMon, etc. to perform its functions. Probe unit 912 may use troute, ping, wget, etc. to perform its functions. Although FIG. 9 is described in terms of an agent version of a service dependency analyzer 206 that runs on an endhost 310 (of FIG. 3), the illustrated units may alternatively be implemented as parts of a packet sniffer version of a service dependency analyzer 206 that runs on a network element 106 (of FIGS. 1-3) or a device connected to a network element.

Figure 10:
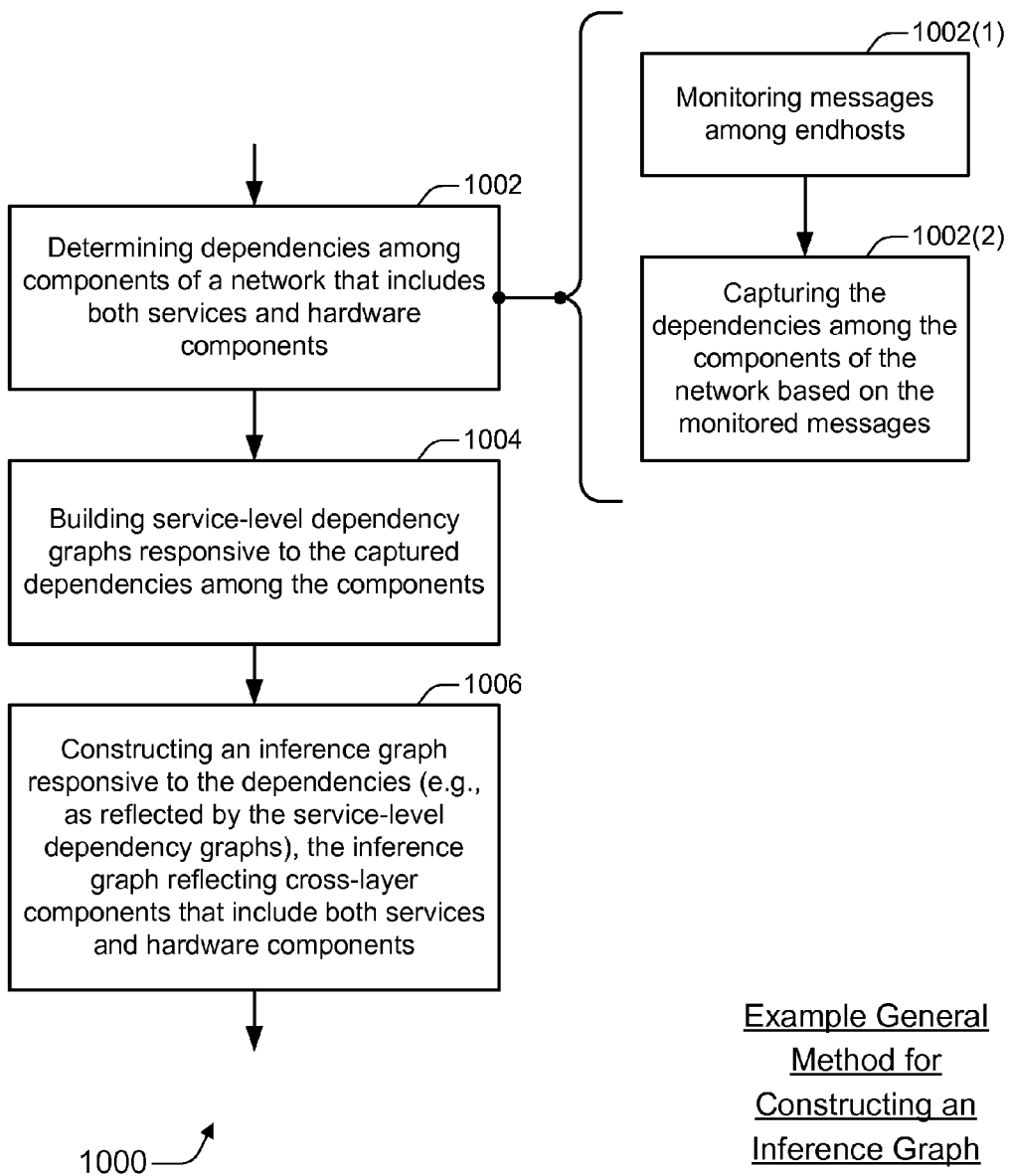
FIG. 10 is a flow diagram that illustrates an example of a general method for constructing an inference graph.

FIG. 10 is a flow diagram 1000 that illustrates an example of a general method for constructing an inference graph. Flow diagram 1000 includes three (3) blocks 1002-1006, with block 1002 also including subblocks 1002(1) and 1002(2). Implementations of flow diagram 1000 may be realized, for example, as processor-executable instructions and/or as service dependency analyzer(s) 206 along with at least one inference graph constructor 208 (of FIGS. 2 and 8). More detailed example embodiments for implementing flow diagram 1000 are described below with reference to FIGS. 11A-15.

Figure 16:
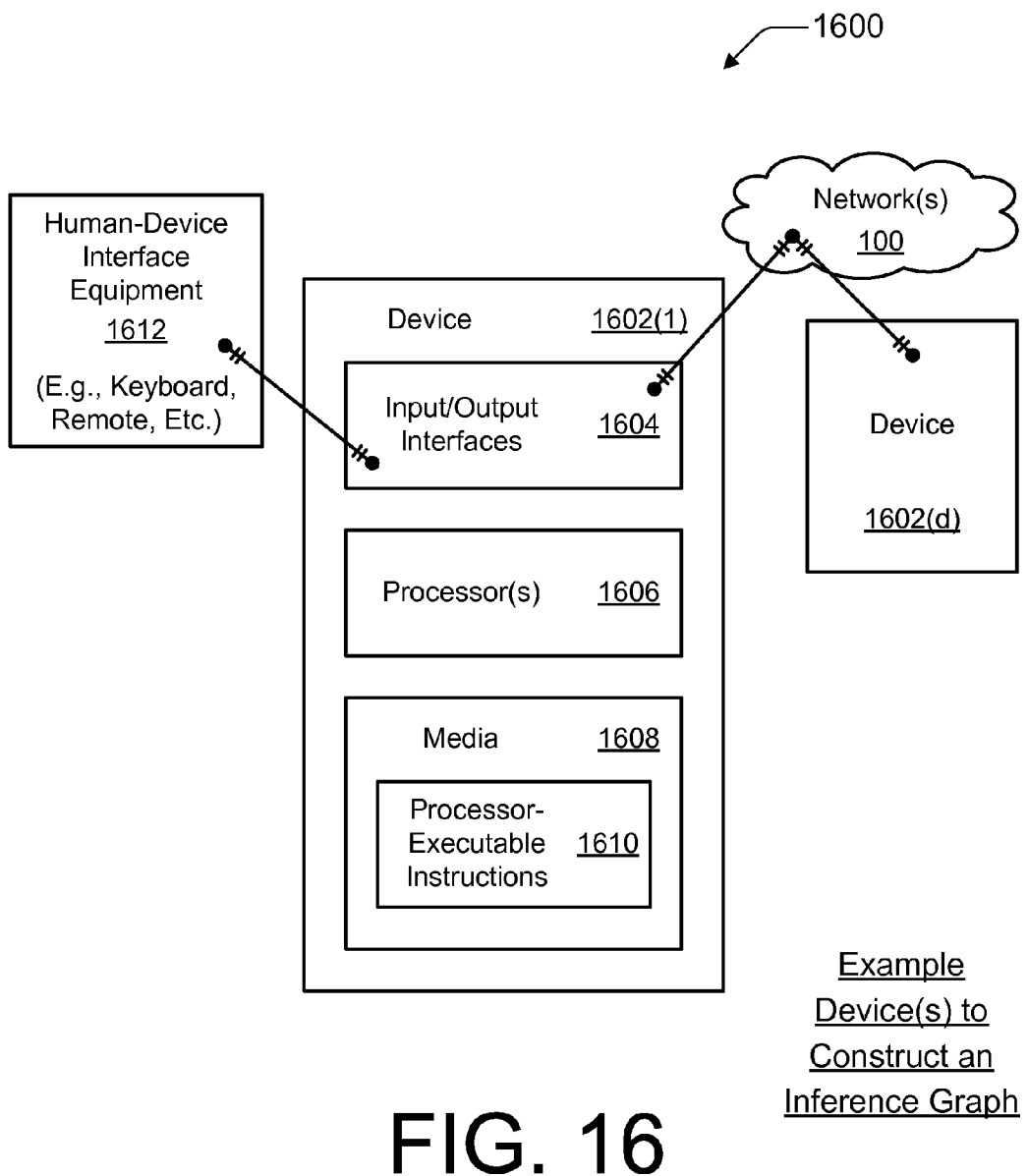
FIG. 16 is a block diagram of an example device that may be used to implement embodiments for constructing an inference graph.

The acts of the flow diagrams that are described herein may be performed in many different environments and with a variety of devices, such as by one or more processing devices (of FIG. 16). The orders in which the methods are described are not intended to be construed as a limitation, and any number of the described blocks can be combined, augmented, rearranged, and/or omitted to implement a respective method, or an alternative method that is equivalent thereto. Although specific elements of other FIGS. are referenced in the description of the flow diagrams, the methods may be performed with alternative elements.

In an example embodiment, at block 1002, dependencies among components of a network are determined, with the network including both service components and hardware components. For example, dependencies between services 306 and hardware components 308 of a network 100 may be determined. Block 1002 may be implemented with subblocks 1002(1) and 1002(2).

At subblock 1002(1), messages among endhosts are monitored. For example, messages between a client 104 and one or more servers 102 may be monitored by a packet trace obtainer 206O of at least one service dependency analyzer 206. At subblock 1002(2), the dependencies among the components of the network are captured based on the monitored messages. For example, the dependencies may be captured by a service dependency determiner 206D of service dependency analyzer 206. For instance, dependencies may be inferred by detecting temporal proximity of monitored messages. In other words, the dependencies may be computed based on the messages that are detected by the act of monitoring and responsive to times or differences between the times at which the messages are detected. Dependency may be inferred, for example, based on the monitored messages and responsive to a predefined dependency interval. An example approach to using a dependency interval is described herein below with particular reference to FIG. 11A.

At block 1004, service-level dependency graphs are built responsive to the captured dependencies among the components. The action(s) of block 1004 may be performed by a service-level dependency graph builder 206B (e.g., of a service dependency analyzer 206). For example, service-level dependency graph builder 206B may build service-level dependency graphs 804 to represent captured dependencies among the components 306 and 308. An example method for building a service-level dependency graph is described herein below with particular reference to FIG. 12. An example of a service-level dependency graph 804\* is described herein below with particular reference to FIG. 13.

At block 1006, an inference graph is constructed responsive to the dependencies (e.g., as reflected by the service-level dependency graphs), with the inference graph reflecting cross-layer components that include both the services and the hardware components. The actions of block 1006 may be performed by an inference graph constructor 208. For example, inference graph constructor 208 may construct an inference graph 204 from service-level dependency graphs 804, with the inference graph reflecting services 306 and hardware components 308 of network 100.

3.1: Discovering Service-Level Dependencies

Each service dependency analyzer 206 is responsible for computing the dependencies among the services its endhost accesses. The dependency probability (DP) of an endhost on service A when accessing service B is the probability an endhost's communication with service B will fail if the endhost is unable to communicate successfully with service A. A value of 1 (e.g., 100%) indicates a strong dependence in which the endhost machine "always" contacts service A before contacting service B. For example, a client visits a desired web server soon after it receives a response from the DNS providing the server's IP address; consequently, the dependency probability of using the DNS when visiting a web server is likely to be closer to 1 than to 0. Due to caching, however, the dependency probability will often be less than 1.

When services are defined in terms of e.g. IP addresses and ports, the inference system need not rely on the parsing of application-specific headers. A finer-grain notion of a service, however, may be implemented if more specific parsers are employed. Without loss of generality, the description below focuses on services that are defined in terms of IP addresses and ports in situations in which application-specific parsers are not employed.

3.1.1: Computing the Dependency Probability

In an example embodiment, the dependency between servers is computed by leveraging the observation that if accessing service B depends on service A, then packet exchanges with services A and B are likely to co-occur in time. Using this observation, the dependency probability of an endhost on service A when accessing service B is approximated as the conditional probability of accessing service A within a short interval, termed the dependency interval herein, prior to accessing service B. Generally, this conditional probability is computed as the number of times in a packet trace that an access to service A precedes an access to service B within the dependency interval.

There is a tension in choosing the value of the dependency interval—too large an interval can introduce false dependencies on services that are accessed with a high frequency, while too small an interval can miss some true dependencies. False positives and false negatives can be handled using the techniques described below with particular reference to FIGS. 11A and 11B.

Figure 11A:
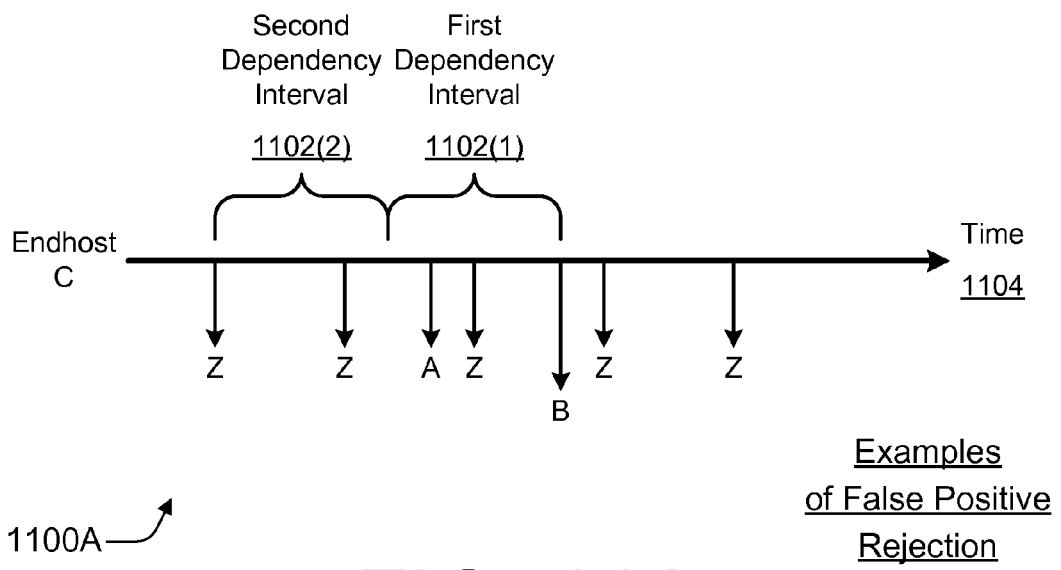
FIGS. 11A and 11B illustrate techniques for handling false positives and false negatives with respect to determining service dependencies.
Figure 11B:
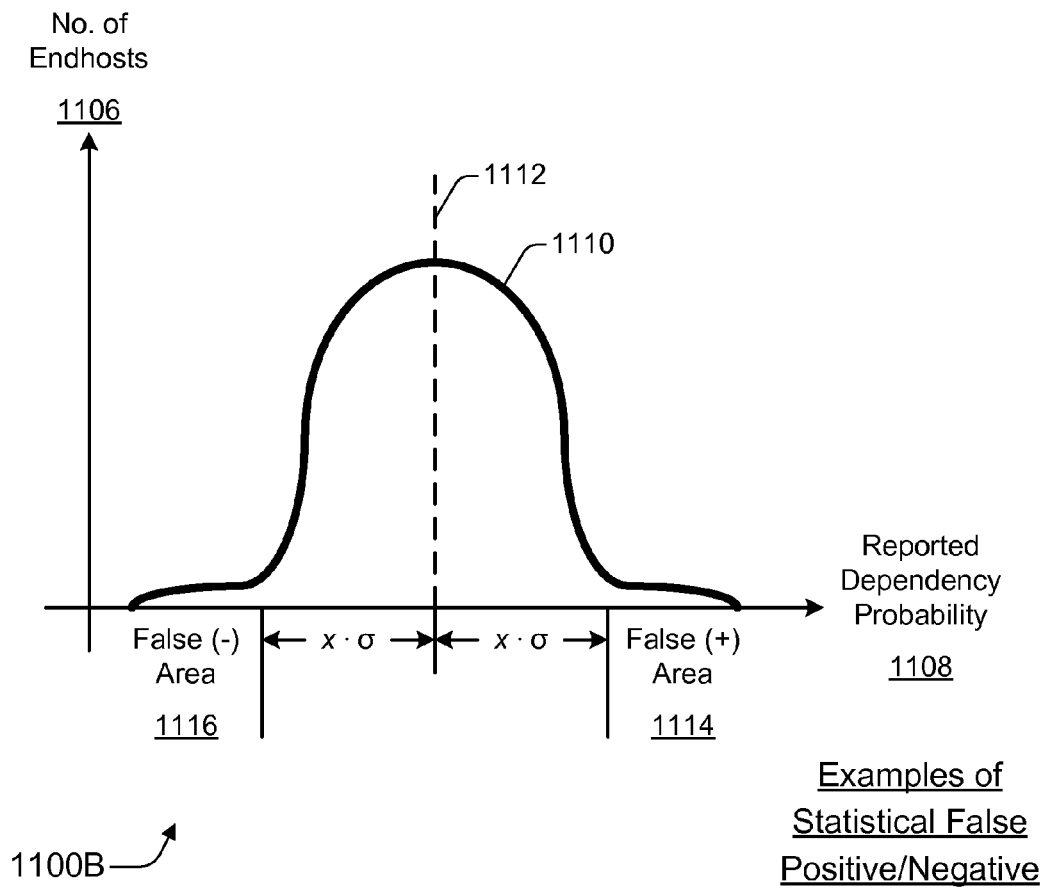

FIGS. 11A and 11B illustrate techniques for handling false positives and false negatives with respect to determining service dependencies. FIG. 11A illustrates techniques for rejecting false positives using a dependency interval approach. FIG. 11B illustrates techniques for identifying false positives and/or false negatives using a statistical approach. FIG. 11A is described below in this section. FIG. 11B is described further below in Section 3.1.2.

As illustrated, FIG. 11A is a graph 1100A that includes a time axis 1104 for an endhost C. Along time axis 1104 are arrows that represent messages that are communicated with services A, B, and Z. Dependency intervals 1102 are also shown. In this example, service B has been specified by a network operator as being of interest. A question is which service(s), if any, is endhost C dependent upon when accessing service B. When an access to service B is detected in a packet trace, a first dependency interval 1102(1) is established prior to this communication.

If another service is communicated with during first dependency interval 1102(1), this other service is (tentatively) considered to be one on which endhost C is dependent when accessing service B. Both services A and Z fit this criterion. Services that are communicated with only outside of this first dependency interval 1102(1) are not considered to be dependent services with respect to (at least this access of) service B. (From another perspective, such other services may be considered to be rejected as being false positives because they do not fall within first dependency interval 1102(1).)

However, service A or service Z may be a false positive even though it occurs within first dependency interval 1102(1). To reject spurious false positives using the dependency interval concept, a second dependency interval 1102(2) is established prior to first dependency interval 1102(1). If a service that is communicated with during first dependency interval 1102(1) is also communicated with during second dependency interval 1102(2), this service may be rejected as being a false positive because it is likely a background service communication that is occurring frequently. Service Z would therefore be rejected as a false positive under this criterion, but service A would be maintained as a dependent service with respect to service B. The first and second dependency intervals may be of different durations, and they may be separated from each other by a period of time.

An example approach to a dependency interval technique may be formulated more rigidly as follows. The dependency interval (DI) may be fixed to an (e.g., 10 ms or any other) appropriate value that is likely to discover most of the dependencies. Service dependency determiners 206D may then apply a straight-forward heuristic to eliminate false positives due to chance co-occurrence. They first calculate the average interval, I, between accesses to the same service and estimate the likelihood of "chance co-occurrence" as (DI)/I. They then retain those dependencies in which the dependency probability is much greater than the likelihood of chance co-occurrence.

These approaches to computing dependency are likely more reliable when a response from service A precedes a request to service B, but without deep packet inspectors it is not feasible to explicitly identify the requests and responses in streams of packets going back and forth between the endhost and service A and between the endhost and service B. Investigation indicates that it is usually sufficient to group together a contiguous sequence of packets to a given service as a single access to that given service. More specifically, but by way of example only, each of the packets of the same 5-tuple that have interpacket spacings less than some predefined amount "X" can be grouped together.

More generally, a dependency probability, which reflects a probability that accessing a specified service is dependent on accessing a dependent service, may be computed responsive to a frequency at which accesses to the specified service and to the dependent service co-occur in time and based on time differences between the co-occurrences. An example of this approach includes the dependency interval technique described above in which a predefined period establishes the applicable time difference between accesses and the expected order of accesses. However, the time period may be adjustable or otherwise varied, the temporal order of the accesses may be interchanged, and so forth.

3.1.2: Aggregating Dependency Probabilities Across Clients

Each of the service dependency analyzers periodically submit the dependency probabilities they measure to the inference engine. However, because some services are accessed infrequently a single host may not have enough samples to compute an accurate probability. Fortunately, many clients in an enterprise network have similar host, software, and network configurations (e.g., clients in the same subnet) and are likely to have similar dependencies. Therefore, the inference engine can aggregate the probabilities of similar clients to obtain more accurate estimates of the dependencies between services.

With reference to FIG. 11B, a graph 1100B includes a horizontal abscissa axis that is labeled as the reported dependency probability 1108 and a vertical ordinate axis that is labeled the number of endhosts 1106. A curve 1110 is plotted on graph 1100B. In this example, curve 1110 is a Gaussian-shaped curve having a mean 1112. A predetermined number "x", with x being some positive real number, of standard deviations $\sigma$ are indicated as extending away from mean 1112 in both the increasing and decreasing directions. Above x·$\sigma$ away from the mean is a false positive area 1114. Below x·$\sigma$ away from the mean is a false negative area 1116.

Aggregation of the reported dependency probabilities from a number of endhosts can provide another mechanism to eliminate false dependencies. This mechanism uses a statistical approach. For example, a client making a large number of requests to a proxy server will indicate that it is dependent on the proxy for all the services that it accesses. To eliminate these false dependencies, the inference system calculates the mean and standard deviation of each dependency probability. It can then exclude reports from clients with a dependency probability more than x standard deviations from the mean.

Alternatively, it can replace a dependency probability that falls outside the range of ±x·$\sigma$ with the mean dependency probability. For example, it may be given that endhosts depend on average on service A with a 90% dependency probability when accessing service B. If an endhost reports a 1% dependency probability, this false negative can be replaced with the 90% dependency probability of the average. On the other hand, it may be given that endhosts depend on average on service A with a 2% dependency probability when accessing service B. If an endhost reports a 96% dependency probability, this false positive can be rejected and/or replaced with a 2% dependency probability from the average. Other statistical paradigms besides those related to Gaussian distributions and/or alternative statistical approaches may be implemented to handle false positives and false negatives.

3.1.3: Service-Level Dependency Graphs

FIG. 12 is a flow diagram 1200 that illustrates an example of a method for building service-level dependency graphs. Flow diagram 1200 includes seven (7) blocks 1202-1214. Implementations of flow diagram 1200 may be realized, for example, as processor-executable instructions and/or as a service dependency analyzer 206, possibly along with at least one inference graph constructor 208 (of FIGS. 2 and 8).

In an example embodiment, at block 1202, at least one service of interest is specified. For example, at least one service 306 may be specified by an operator (e.g., an IT administrator) of a network 100. The actions of flow diagram 1200 may be implemented for each specified service.

At block 1204, packet traces are obtained. For example, at each service dependency analyzer 206, a packet trace obtainer 206O may record incoming and outgoing packets that are received and sent, respectively. From these recorded packets, the origins and destinations of the packets can be ascertained.

At block 1206, consecutive packets of the same flow are bunched into respective messages between endhosts. For example, by detecting interactions with respective individual services, a service dependency determiner 206D at each service dependency analyzer 206 may bunch consecutive packets into messages pertaining to respective service requests.

At block 1208, within a dependency interval, which other service(s) are communicated with prior to communicating with the specified service are ascertained. For example, service dependency determiner 206D may ascertain which other service(s) are communicated with during a first dependency interval 1102(1) prior to communicating with a specified service. There may be multiple such ascertained dependent services for a single specified service.

At block 1210, the dependency probability is computed. For example, service dependency determiner 206D may compute a dependency probability for each such ascertained dependent service. For instance, an entire obtained packet trace may be analyzed and the total number of accesses to a specified service determined. A number of times that an ascertained dependent service co-occurs during the dependency interval is also determined. The quotient of the number of co-occurrences divided by the total number of specified service accesses is the dependency probability. This dependency probability may be adjusted or otherwise affected by false positive/negative handling, as noted below with reference to block 1214.

At block 1212, a service-level dependency graph for the specified service is formulated using the ascertained dependent services and the computed dependency probabilities. For example, a service-level dependency graph builder 206B of service dependency analyzer 206 may build a service-level dependency graph 804. An example service-level dependency graph 804* is described herein below with particular reference to FIG. 13. For each specified service, a respective computed dependency probability may be associated with a respective ascertained dependent service and applied to associated edge labels. If there are multiple ascertained dependent services, there can be multiple associated dependency probabilities.

At block 1214, false positives and false negatives are identified and handled. For example, false positives and/or false negatives may be identified and handled by service dependency analyzer 206 and/or inference graph constructor 208. For instance, service dependency analyzer 206 may reject false positives using one or more dependency interval approaches, and inference graph constructor 208 may reject or correct false positives and/or correct false negatives using a statistical technique. With either a false positive or a false negative, an error may be replaced by a statistically-likely value, such as the mean dependency probability computed by similar endhosts. The action(s) of block 1214 may be performed, for example, in conjunction with those of block 1208 and/or after those of block 1210.

Figure 13:
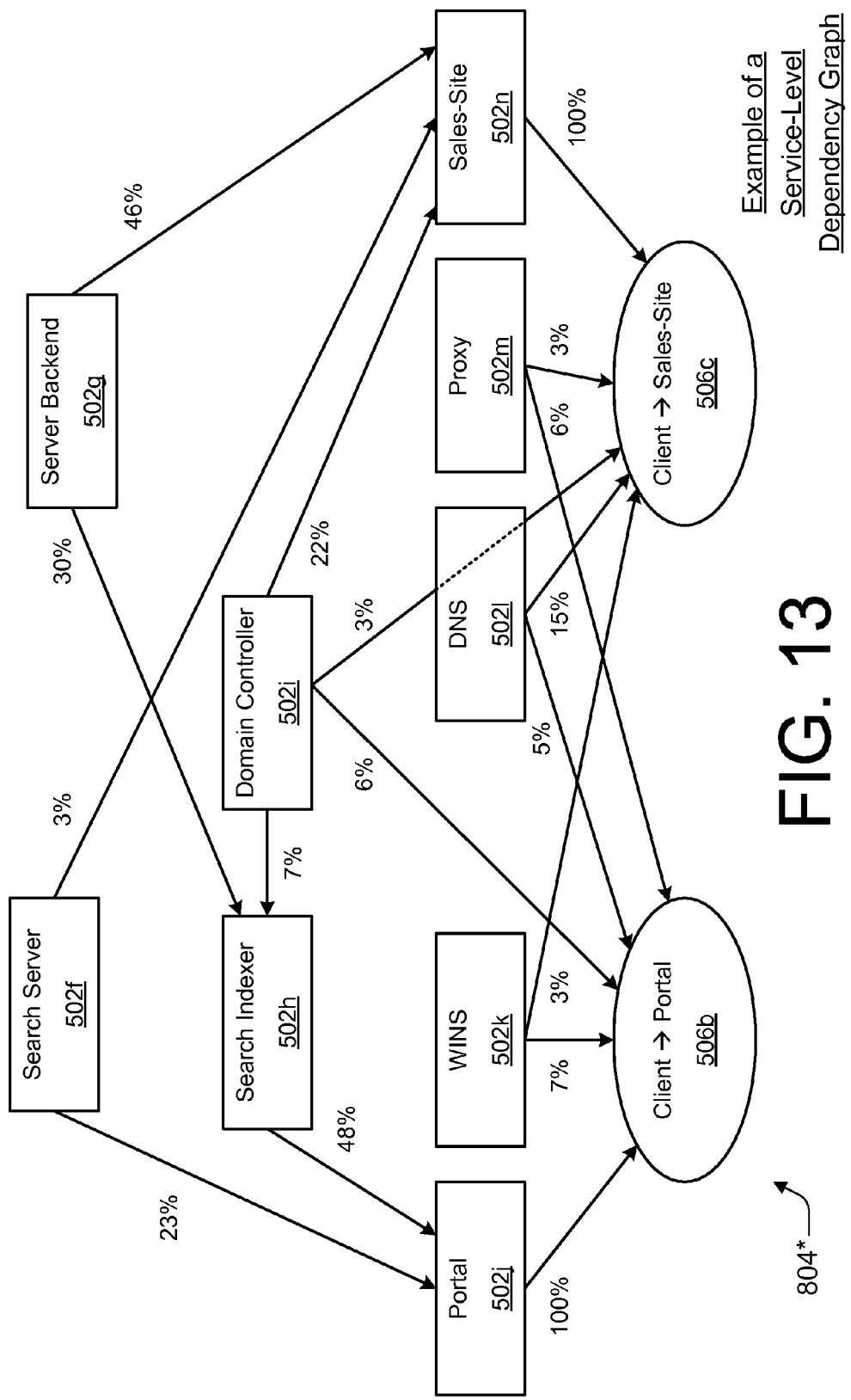
FIG. 13 is a block diagram of a portion of an example service-level dependency graph.

FIG. 13 is a block diagram of a portion of an example service-level dependency graph 804*. As illustrated, service-level dependency graph 804* includes two observation nodes 506 and nine root-cause nodes 502. Specifically, the two observation nodes 506 are: a client accessing a portal service 506b and a client accessing a sales-site service 506c. The nine root-cause nodes 502 are: search server 502f, server backend 502g, search indexer 502h, domain controller 502i, portal 502j, WINS 502k, DNS 502l, proxy 502m, and sales-site 502n. Each of the nodes of service-level dependency graph 804* is connected to at least one other node by an edge that is associated with a dependency probability, which are expressed in terms of percentages.

By way of example, client-accessing-the-portal observation node 506b is dependant on portal root-cause node 502j with a dependency probability of 100%. It is also dependent on WINS root-cause node 502k, domain controller root-cause node 502i, DNS root-cause node 502l, and proxy root-cause node 502m with dependency probabilities of 7%, 6%, 5%, and 6%, respectively. Portal root-cause node 502j is in turn dependent on search server root-cause node 502f and search indexer root-cause node 502h with dependency probabilities of 23% and 48%, respectively. Search indexer root-cause node 502h is itself dependent on server backend root-cause node 502g and domain controller root-cause node 502i with dependency probabilities of 30% and 7%, respectively.

3.2: Constructing an Inference Graph

This section describes how an inference graph constructor 208 combines dependencies between services, as reported by service dependency analyzers 206, with network topology information to construct a unified inference graph 204.

Figure 14:
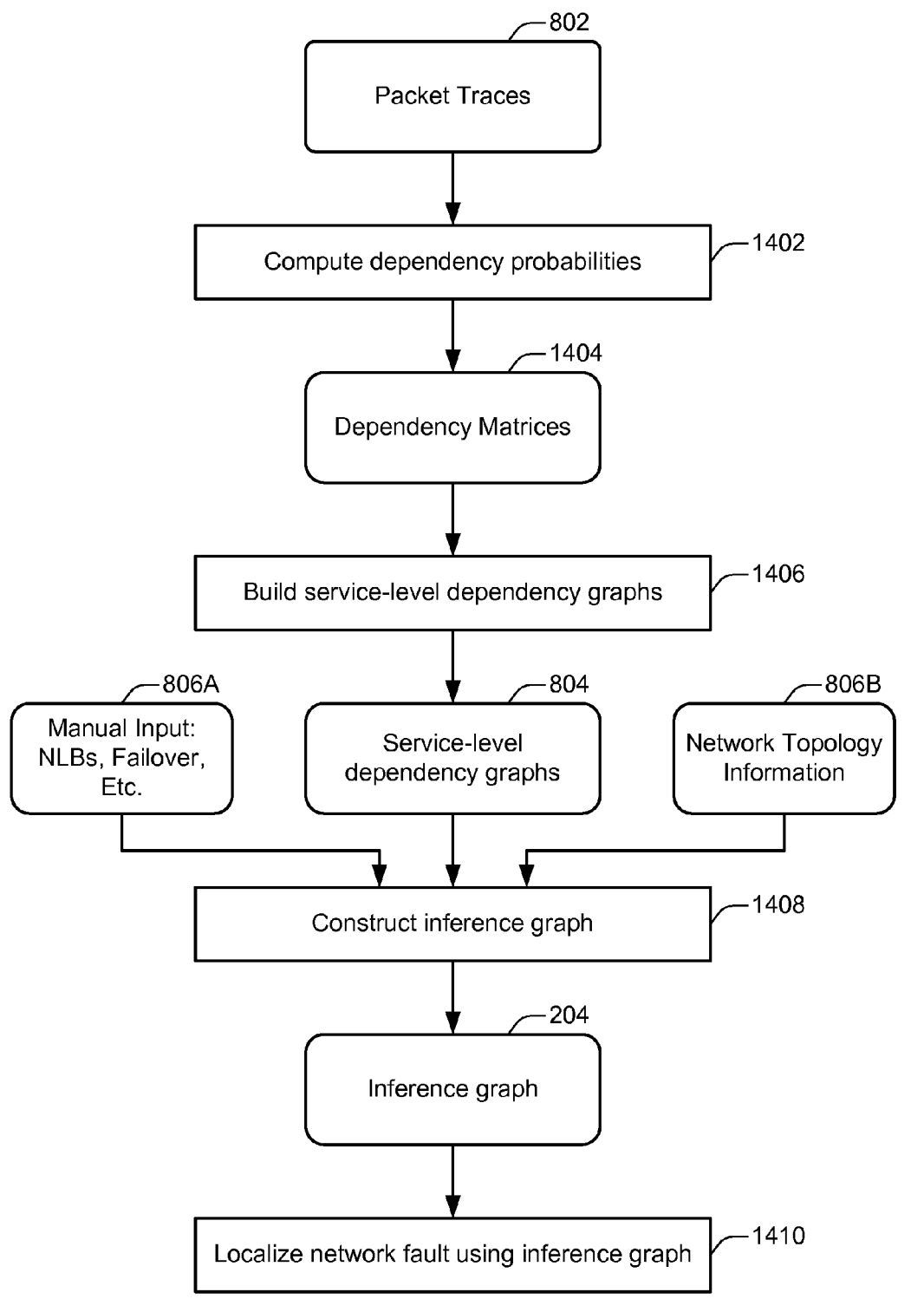
FIG. 14 is a flow diagram that illustrates another example of a general method for constructing an inference graph.

FIG. 14 is a flow diagram 1400 that illustrates another example of a general method for constructing an inference graph. Flow diagram 1400 includes ten (10) blocks, including four blocks that represent actions: 1402, 1406, 1408, and 1410. Block 1404 introduces dependency matrices 1404. Implementations of flow diagram 1400 may be realized, for example, as processor-executable instructions and/or as a service dependency analyzer 206 along with at least one inference graph constructor 208 (of FIGS. 2 and 8).

In an example embodiment, obtained packet traces 802 are input into the inference graph construction process. Obtaining the packet traces may also be considered as part of the inference graph construction process. At block 1402, dependency probabilities between services are computed. For example, for each respective specified service, dependency probabilities for respective dependent services may be computed. These computed dependency probabilities for each specified service with regard to each dependent service and for each client (or other endhost) may be organized into one or more dependency matrices 1404.

A dependency matrix 1404 may indicate the probability that access to a given specified service is dependent on accessing another service for each of the specified services and ascertained dependent services. The dependency matrices may be organized to include dependency probabilities computed from each potential endhost client to form a three-dimensional dependency probability matrix having three variables: specified services, client endhosts, and dependent services. Each entry in the matrix is a dependency probability for a dependent service given a specified service as determined at a particular endhost client. Two-dimensional dependency matrices 1404 that are determined at each endhost client may be used to build service-level dependency graphs 804 at block 1406. In an example implementation, the actions of blocks 1402 and 1406 are performed by a service dependency analyzer 206, and the action(s) of block 1408 are performed by an inference graph constructor 208. However, the actions may be otherwise distributed or performed by different module(s) of processor-executable instructions.

Manual input 806A can include load balancing mechanisms, fail-over infrastructure, and other such network hardware components. In an alternative embodiment, some or all of input 806A may be provided programmatically. For example, a script may be used to identify each of the servers providing DNS service. The script may also direct the construction of the inference graph (of block 1408) to include the insertion of the appropriate load-balancing and fail-over meta-nodes. Service-level dependency graphs 804 are built at 1406 for each specified service that is reported from each endhost. Network topology information 806B represents the physical components of the network, including network elements. Manual inputs 806A, network topology information 806B, and service-level dependency graphs 804 are used to construct an inference graph 204 at block 1408.

Inference graph 204 may be used to localize performance faults in the network at block 1410. For example, a statistical analysis may be applied to inference graph 204 by inference engine 202 given both determined service-level dependencies and computed dependency probabilities and in view of observed network performance characteristics. Postulated problems at root-cause nodes of inference graph 204 in the form of candidates are probabilistically propagated to other states through the nodes of the graph. The states may be propagated using, for example, the characteristics of meta-nodes that are described herein above in Section 2.2 "Probabilistic Modeling for Meta-Nodes". Those candidates that most accurately reflect observed network performance characteristics are the most likely candidates for causing the network fault.

Figure 15:
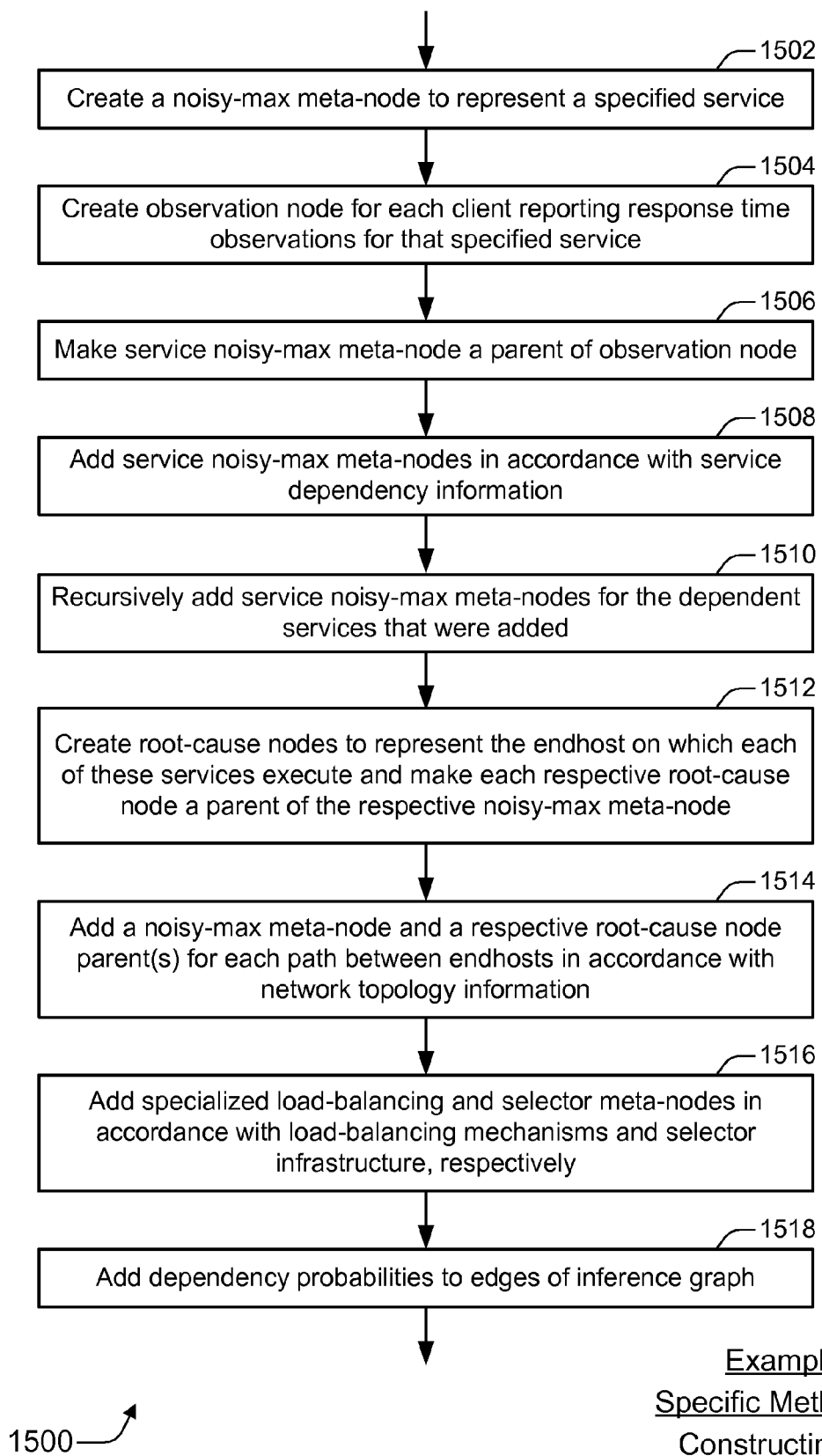
FIG. 15 is a flow diagram that illustrates an example of a relatively specific method for constructing an inference graph.

FIG. 15 is a flow diagram 1500 that illustrates an example of a relatively specific method for constructing an inference graph. Flow diagram 1500 includes nine (9) blocks 1502-1518. Implementations of flow diagram 1500 may be realized, for example, as processor-executable instructions and/or or as at least one inference graph constructor 208 (of FIGS. 2 and 8).

In an example embodiment, for each service S the network operator has chosen to monitor, the inference graph constructor first creates a noisy-max meta-node to represent the service (at block 1502). It then creates an observation node for each client (or other endhost) reporting response time observations of that service (at block 1504) and makes the service meta-node a parent of the observation node (at block 1506).

The inference graph constructor then examines the service dependency information of these clients to identify the set of services $D_S$ that the clients were dependent on when accessing S as well as the set of services that service S is dependent on. The inference graph constructor then recurses, expanding each service in $D_S$ as if the operator had expressed interest in monitoring it too. Once the service meta-nodes for the dependent services and the recursively-determined services have been created (at blocks 1508 and 1510), for each of these nodes the inference graph constructor creates a root-cause node to represent the endhost on which the service runs and makes the respective root-cause a parent of the respective meta-node (at block 1512).

Example pseudo-code for recursively creating the service nodes in an inference graph is as follows:

```
expand (S)
    find CL = clients using S
    D_S = (find services that CL depends on AND
           find services that S depends on)
    for each S ∈ D_S, expand (S).
```

The inference graph constructor then adds network topology information to the inference graph, e.g., by using traceroute results reported by the service dependency analyzers 206. For each path between endhosts in the inference graph, it adds a noisy-max meta-node to represent the path and root-cause nodes to represent every router, switch, hub, link, etc. on the path (at block 1514). It then adds each of these root-causes as parents of the path meta-node (also at block 1514).

Network operators may also inform the inference graph constructor where load balancing and/or redundancy techniques are employed within the network. The inference graph constructor can update the inference graph by employing the appropriate specialized meta-node (e.g., selector or fail-over) (at block 1516). Adapting a local environment to the configuration language of the inference graph constructor may involve some scripting. For example, to model load-balanced servers in a particular enterprise network, translation scripts may be created that leverage naming conventions, such as dc-* for domain controllers, sitename-* for the webservers hosting sitename, and so forth. The default meta-nodes can then be replaced with specialized selector meta-nodes. Also, a service dependency analyzer may examine its host's DNS configuration to identify where to place a specialized failover meta-node to model the primary/secondary relationship between its name resolvers or in other redundancy situations.

Inference graph constructor 208 also assigns probabilities to the edges of the inference graph (at block 1518). The dependency probabilities from the service-level dependency graphs may be directly copied onto corresponding edges in the inference graph. For some special cases, example edge probabilities are given below. With reference to FIGS. 5 and 6, the special root-cause nodes always troubled 502(AT) and always down 502(AD) are connected to observation nodes 506 with a specialized probability of e.g. 0.001, which implies that 1 in 1000 failures is caused by a component that is not included in the model. Investigation has indicated that the results are usually insensitive to the precise probabilistic parameter setting, within this order of magnitude. Edges between a router and a path meta-node may use another specialized probability of e.g. 0.9999, which implies that there is a 1 in 10,000 chance that the network topology or traceroutes were incorrect and that the router is therefore not actually on the path.

Example Device Implementations for Constructing an Inference Graph

FIG. 16 is a block diagram 1600 of an example device 1602 that may be used to implement embodiments for constructing an inference graph. As illustrated, two devices 1602(1) and 1602(*d*) are capable of engaging in communications via network(s) 100. Although two devices 1602 are specifically shown, one or more than two devices 1602 may be employed, depending on implementation. Network(s) 100 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth.

Generally, a device 1602 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 1602 includes one or more input/output (I/O) interfaces 1604, at least one processor 1606, and one or more media 1608. Media 1608 include processor-executable instructions 1610.

In an example embodiment of device 1602, I/O interfaces 1604 may include (i) a network interface for monitoring and/or communicating across network 100, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) human-device interfaces include those that communicate by wire or wirelessly to human-device interface equipment 1612 (e.g., a keyboard, a remote, a mouse or other graphical pointing device, etc.).

Generally, processor 1606 is capable of executing, performing, and/or otherwise effectuating processor-executable instructions, such as processor-executable instructions 1610. Media 1608 is comprised of one or more processor-accessible media. In other words, media 1608 may include processor-executable instructions 1610 that are executable by processor 1606 to effectuate the performance of functions by device 1602. Processor-executable instructions may be embodied as software, firmware, hardware, fixed logic circuitry, some combination thereof, and so forth.

Thus, realizations for constructing an inference graph may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1606 may be implemented using any applicable processing-capable technology, and one may be realized as a general purpose processor (e.g., a central processing unit (CPU), a microprocessor, a controller, etc.), a graphics processing unit (GPU), a derivative thereof, and so forth. Media 1608 may be any available media that is included as part of and/or accessible by device 1602. It includes volatile and non-volatile media, removable and non-removable media, storage and transmission media (e.g., wireless or wired communication channels), hard-coded logic media, combinations thereof, and so forth. Media 1608 is tangible media when it is embodied as a manufacture and/or as a composition of matter. For example, media 1608 may include an array of disks or flash memory for longer-term mass storage of processor-executable instructions 1610, random access memory (RAM) for shorter-term storage of instructions that are currently being executed and/or otherwise processed, link(s) on network 100 for propagating communications, and so forth.

As specifically illustrated, media 1608 comprises at least processor-executable instructions 1610. Generally, processor-executable instructions 1610, when executed by processor 1606, enable device 1602 to perform the various functions described herein. Such functions include, but are not limited to: (i) those that are illustrated in flow diagrams 1000, 1200, 1400, and 1500 (of FIGS. 10, 12, 14, and 15); (ii) those that are performed by service dependency analyzers 206 and inference graph constructor 208 (of FIGS. 2 and 8); (iii) those pertaining to handling false positives and/or false negatives (e.g., of FIGS. 11A and 11B); (iv) those embodied by service-level dependency graphs 804 and/or an inference graph 204 (of FIGS. 2, 6, 8, and 13); combinations thereof; and so forth.

The devices, acts, aspects, features, functions, procedures, modules, data structures, techniques, components, units, etc. of FIGS. 1-16 are illustrated in diagrams that are divided into multiple blocks and other elements. However, the order, interconnections, interrelationships, layout, etc. in which FIGS. 1-16 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for constructing an inference graph.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claimed invention.

What is claimed is:

1. A method, implemented by a processor, comprising:
   determining dependencies among components of a network, the components including services and hardware components;
   constructing an inference graph for the network responsive to the dependencies, the inference graph reflecting cross-layer components including the services and the hardware components, each of the services having one of three states comprising an up state when a response time is within a normal range, a down state when service requests result in an error status code or no response at all, and a troubled state when the response time fails to meet a predetermined performance goal; and
   incorporating a load-balancing mechanism and a failover mechanism present in the network to the inference graph.

2. The method as recited in claim 1, wherein the act of determining comprises:
   monitoring messages exchanged between endhosts of the network; and
   capturing the dependencies among the components of the network based on the messages.

3. The method as recited in claim 2, wherein the act of monitoring comprises at least one act of:
   monitoring the messages using agents executing on multiple endhost machines of the network; or
   monitoring the messages using packet sniffers at multiple hardware components of the network, the multiple hardware components including network elements and endhost machines.

4. The method as recited in claim 2, further comprising:
   building service-level dependency graphs responsive to the dependencies that are captured among the components of the network by the act of capturing;
   wherein the act of constructing comprises constructing the inference graph by combining the service-level dependency graphs.

5. The method as recited in claim 4, wherein the act of constructing further comprises:
   constructing the inference graph using topology information for the network.

6. The method as recited in claim 2, wherein the acts of monitoring and capturing comprise:
   computing the dependencies based on the messages that are detected by the act of monitoring and responsive to times or differences between the times at which the messages are detected.

7. The method as recited in claim 6, wherein the act of capturing further comprises:
   rejecting a reported dependency on a given service as a false positive or replacing a reported dependency on a given service as a false negative based on a statistical analysis of respective message exchanges between a given endhost that corresponds to the given service and respective ones of other endhosts.

8. The method as recited in claim 6, wherein the act of computing comprises:
   computing the dependencies based on the messages that are detected by the act of monitoring and responsive to a predefined dependency interval.

9. The method as recited in claim 8, wherein the act of computing further comprises:
   rejecting a potential dependency on a given service as a false positive based on an average interval of a repeated message exchange to a given endhost that corresponds to the given service and responsive to a length of the predefined dependency interval.

10. The method as recited in claim 2, wherein the act of constructing comprises:
    constructing the inference graph to include at least three different types of nodes, the three different types of nodes comprising:
    root-cause nodes that correspond to hardware components or services whose failure or degradation can impact user-perceptible performance;
    observation nodes that represent accesses to services of the network; and
    meta-nodes that model dependencies between the observation nodes and the root-cause nodes.

11. The method as recited in claim 10, wherein the act of constructing further comprises:
    constructing the inference graph to include meta-nodes that model dependency relationships between nodes of the inference graph other than noisy-max.

12. The method as recited in claim 10, wherein the act of constructing further comprises:
    constructing the inference graph to include edges that interconnect the root-cause nodes, the observation nodes, and the meta-nodes;
    wherein a particular edge from a first node to a second node encodes a probabilistic dependency in which a probability indicates how likely it is that a state of the first node affects a state of the second node.

13. A system comprising:
    a memory;
    one or more processors coupled to the memory;
    a service dependency analyzer, stored in the memory and operable on the one or more processors, to determine dependencies among components of a network, the components including services and hardware components, each of the services associated with one of three states that include an up state when a response time is within a normal range, a down state when service requests result in an error status code or no response at all, and a troubled state when the response time fails to meet a predetermined performance goal; and an inference graph constructor to construct an inference graph for the network responsive to the dependencies, the inference graph reflecting cross-layer components including the services and the hardware components and incorporating a load-balancing mechanism and a failover mechanism present in the network.

14. The system as recited in claim 13, wherein the service dependency analyzer comprises:

a packet trace obtainer to monitor messages exchanged between endhosts of the network; and a service dependency determiner to capture the dependencies among the components of the network based on the messages.

15. The system as recited in claim 14, wherein the service dependency analyzer further comprises:

a service-level dependency graph builder to build service-level dependency graphs responsive to the dependencies that are captured among the components of the network by the service dependency determiner, each service-level dependency graph reflecting one or more respective dependency probabilities between a specified service and one or more respective dependent services on which performance of the specified service depends probabilistically;

wherein the inference graph constructor is further to construct the inference graph by combining the service-level dependency graphs.

16. A method, implemented by a processor, comprising:

determining dependencies among components of a network by monitoring messages exchanged between endhosts of the network and by capturing the dependencies among the components of the network based on the messages, the components including at least one of services or hardware components, the services comprising one of three states that include an up state when a response time is within a normal range, a down state when service requests result in an error status code or no response at all, and a troubled state when the response time fails to meet a predetermined performance goal; and constructing an inference graph for the network responsive to the dependencies, the inference graph including root-cause nodes, observation nodes, and meta-nodes; wherein:

the root-cause nodes correspond to services whose failure or degradation can impact user-perceptible performance of the network;

the observation nodes represent accesses to services of the network; and the meta-nodes model dependencies between the observation nodes and the root-cause nodes.

17. The method as recited in claim 16, wherein:

the act of capturing comprises computing a dependency probability, which reflects a probability that accessing a specified service is dependent on accessing a dependent service, responsive to a frequency at which accesses to the specified service and to the dependent service co-occur in time and based on time differences between the co-occurrences.

18. The method as recited in claim 16, wherein the act of constructing comprises:

creating a meta-node to represent a specified service that is to be monitored;

creating an observation node corresponding to an endhost client that is to report response time observations for the specified service; and making the meta-node a parent of the observation node.

19. The method as recited in claim 18, wherein the acts of creating a meta-node, creating an observation node, and making the meta-node a parent of the observation node comprise:

merging the meta-node with the observation node by incorporating one or more probabilities associated with the meta-node into the observation node.

20. The method as recited in claim 18, wherein the act of constructing further comprises:

adding a service meta-node for each dependent service on which the specified service depends;

recursively adding service meta-nodes for services on which each dependent service of the specified service is dependent; and creating respective root-cause nodes corresponding to respective endhosts that provide the specified service, at least one of the dependent services, or at least one of the services on which a dependent service depends.

* * * * *